(12) United States Patent
Shahbazi et al.

(10) Patent No.: US 10,742,634 B1
(45) Date of Patent: Aug. 11, 2020

(54) METHODS FOR SINGLE SIGN-ON (SSO) USING OPTICAL CODES

(71) Applicants: Majid Shahbazi, Oakton, VA (US);
Mahmood Shahbazi, Oakton, VA (US)

(72) Inventors: Majid Shahbazi, Oakton, VA (US);
Mahmood Shahbazi, Oakton, VA (US)

( * ) Notice: Subject to any disclaimer, the term of this patent is extended or adjusted under 35 U.S.C. 154(b) by 169 days.

(21) Appl. No.: 15/099,490

(22) Filed: Apr. 14, 2016

Related U.S. Application Data

(63) Continuation-in-part of application No. 14/304,076, filed on Jun. 13, 2014, now Pat. No. 9,356,924, which is a continuation-in-part of application No. 13/338,156, filed on Dec. 27, 2011, now Pat. No. 8,819,444.

(51) Int. Cl.
*H04L 29/06* (2006.01)
*G06K 7/10* (2006.01)

(52) U.S. Cl.
CPC ...... *H04L 63/0815* (2013.01); *G06K 7/10821* (2013.01); *H04L 63/06* (2013.01); *H04L 63/062* (2013.01)

(58) Field of Classification Search
CPC ... H04L 63/0815; H04L 63/06; H04L 63/062; G06K 7/10821
USPC .......................................................... 713/168
See application file for complete search history.

(56) References Cited

U.S. PATENT DOCUMENTS

| | | | |
|---|---|---|---|
| 6,006,333 A * | 12/1999 | Nielsen | G06F 21/41 709/203 |
| 6,243,816 B1 | 6/2001 | Fang et al. | |
| 6,263,446 B1 | 7/2001 | Kausik et al. | |
| 6,892,307 B1 * | 5/2005 | Wood | G06F 21/41 713/155 |
| 7,360,096 B2 | 4/2008 | Bracewell et al. | |
| 8,024,781 B2 | 9/2011 | Saunders et al. | |
| 8,327,141 B2 | 12/2012 | Vysogorets et al. | |
| 8,381,272 B1 * | 2/2013 | Nelson | H04L 9/0861 705/18 |
| 8,490,200 B2 | 7/2013 | Rivera et al. | |
| 8,551,186 B1 | 10/2013 | Strand | |
| 8,555,079 B2 | 10/2013 | Shablygin et al. | |
| 8,572,375 B2 | 10/2013 | Bishop et al. | |
| 8,656,180 B2 | 2/2014 | Shablygin et al. | |
| 8,661,254 B1 | 2/2014 | Sama | |
| 8,701,013 B2 | 4/2014 | Cox et al. | |
| 8,713,661 B2 | 4/2014 | Vysogorets et al. | |
| 8,751,794 B2 | 6/2014 | Hauluund | |
| 8,751,829 B2 | 6/2014 | Vysogorets et al. | |
| 8,752,153 B2 | 6/2014 | Vysogorets et al. | |
| 8,769,618 B2 | 7/2014 | Husemann et al. | |
| 8,800,061 B2 | 8/2014 | Glave | |
| 8,819,444 B2 | 8/2014 | Shahbazi et al. | |
| 8,819,769 B1 | 8/2014 | van Dijk et al. | |

(Continued)

OTHER PUBLICATIONS

Shahbazi et al., U.S. Appl. No. 15/229,636, filed Aug. 5, 2016.

*Primary Examiner* — Matthew T Henning

(57) ABSTRACT

Automated methods for single sign-on (SSO) to a plurality of websites using optical codes. A login server communicates with a user computer browser and a user mobile device to validate the user. When the user goes to a website, the website presents an optical code to the user computer browser. The user mobile device obtains the optical code and communicates with the login server to automatically log the user in.

20 Claims, 17 Drawing Sheets

Multiple Login Options

430

(56) References Cited

U.S. PATENT DOCUMENTS

| | | |
|---|---|---|
| 8,826,019 B2 | 9/2014 | Shablygin et al. |
| 8,826,399 B2 | 9/2014 | Dorso et al. |
| 8,839,391 B2 | 9/2014 | Vysogorets et al. |
| 8,855,300 B2 | 10/2014 | Weis et al. |
| 8,861,724 B2 | 10/2014 | Weis et al. |
| 8,869,245 B2 | 10/2014 | Ranganathan et al. |
| 8,924,712 B2 | 12/2014 | Varadarajan et al. |
| 8,932,368 B2 | 1/2015 | Fitzgerald et al. |
| 8,935,777 B2 | 1/2015 | DeSoto et al. |
| 8,943,320 B2 | 1/2015 | Sabin et al. |
| 8,972,719 B2 | 3/2015 | Shablygin et al. |
| 9,077,713 B1 | 7/2015 | Zheng et al. |
| 9,177,169 B2 | 11/2015 | Shablygin et al. |
| 9,203,824 B1 | 12/2015 | Nunn et al. |
| 9,356,924 B1 | 5/2016 | Shahbazi et al. |
| 2003/0012382 A1 | 1/2003 | Ferchichi et al. |
| 2004/0003081 A1* | 1/2004 | Justus ............... H04L 63/0815 709/225 |
| 2004/0093527 A1* | 5/2004 | Pering ................. G06F 21/36 726/5 |
| 2004/0098609 A1 | 5/2004 | Bracewell et al. |
| 2004/0117649 A1* | 6/2004 | Whyte ................. H04L 9/085 380/286 |
| 2004/0148253 A1 | 7/2004 | Shin et al. |
| 2005/0188222 A1 | 8/2005 | Motsinger et al. |
| 2005/0275661 A1* | 12/2005 | Cihula ................. G06F 21/55 345/619 |
| 2008/0070593 A1 | 3/2008 | Altman |
| 2008/0092154 A1* | 4/2008 | Hogyoku ............. H04N 7/163 725/1 |
| 2008/0134308 A1 | 6/2008 | Yalakanti et al. |
| 2008/0141351 A1 | 6/2008 | Park |
| 2008/0276308 A1 | 11/2008 | Graser et al. |
| 2010/0070759 A1 | 3/2010 | Leon Cobos et al. |
| 2010/0134299 A1 | 6/2010 | Fitzgerald et al. |
| 2010/0211796 A1* | 8/2010 | Gailey ................. G06F 21/31 713/182 |
| 2010/0217977 A1* | 8/2010 | Goodwill .............. G06F 21/78 713/167 |
| 2010/0239087 A1* | 9/2010 | Chaisson ............. G06F 21/46 380/44 |
| 2010/0306547 A1 | 12/2010 | Fallows et al. |
| 2011/0219427 A1 | 9/2011 | Hito et al. |
| 2012/0226815 A1* | 9/2012 | Goodman ............. H04L 65/80 709/228 |
| 2012/0240204 A1* | 9/2012 | Bhatnagar ............ G06F 21/35 726/5 |
| 2012/0250065 A1* | 10/2012 | Partridge ............. G06F 21/608 358/1.14 |
| 2013/0037429 A1 | 2/2013 | Sarnoff et al. |
| 2013/0166918 A1* | 6/2013 | Shahbazi ............. H04L 9/0863 713/183 |
| 2013/0183955 A1 | 7/2013 | Ron et al. |
| 2014/0182002 A1 | 6/2014 | Cox et al. |
| 2014/0189831 A1 | 7/2014 | Kemshall |
| 2014/0282923 A1 | 9/2014 | Narayan et al. |
| 2014/0282961 A1 | 9/2014 | Dorfman |
| 2014/0298491 A1 | 10/2014 | D'sa |
| 2014/0338006 A1 | 11/2014 | Grkov et al. |
| 2014/0351589 A1* | 11/2014 | Chenna ............... H04L 63/0823 713/168 |
| 2015/0109428 A1 | 4/2015 | Mechaley et al. |
| 2015/0257004 A1* | 9/2015 | Shanmugam ......... H04W 12/06 455/411 |
| 2015/0278805 A1* | 10/2015 | Spencer, III .......... G06F 21/36 705/44 |
| 2016/0034678 A1 | 2/2016 | Chandra |
| 2017/0262845 A1 | 9/2017 | Eisen |

\* cited by examiner

Photo-Login/Video-Login Process

US 10,742,634 B1

METHODS FOR SINGLE SIGN-ON (SSO) USING OPTICAL CODES

This application is a Continuation-in-Part of U.S. Non-Provisional application Ser. No. 14/304,076 filed Jun. 13, 2014, which in turn is a Continuation-in-Part of U.S. Non-Provisional application Ser. No. 13/338,156 filed Dec. 27, 2011, now U.S. Pat. No. 8,819,444.

FIELD OF THE INVENTION

The present disclosure relates generally to secure digital communication, and more particularly to decentralized credential management.

BACKGROUND OF THE INVENTION

Today, users are conducting online transactions at an ever increasing rate. In light of this phenomenon, it is not uncommon for a user to have anywhere from twenty to eighty, or more, separate online accounts. Examples of such accounts may include, email, news, social networking sites, online banking, music, movies, games, online auctions, shopping, and more. Typically, a user must possess a separate ID and password to access each of these accounts.

One ongoing dilemma concerning passwords, is that as computer processing capabilities increase, passwords must become longer and more complex to be considered "secure." The problem is that, it is difficult for users to remember more than just a handful of different passwords at a time. As a result, users often "recycle" their passwords (often containing names of relatives or pets, birthdates, etc.—making them even less secure. If a password is too complex, users will often write it down next to their computers to serve as reminders. However anyone walking by could easily obtain the password and use it to gain unauthorized access to the user's system. If one password is obtained or intercepted, it is likely that it can also be successfully used to gain access to several of the user's other accounts (if a similar password is used). Even if a user manages to remember their passwords and to keep them physically secure, it is still possible to easily intercept and read passwords when sent in the clear over a non-secure network. For example, many users' are unaware of implications of sending clear-text passwords over open wifi networks—despite their growing popularity.

Another problem of an even larger scope is that of "centralized" password storage and encryption. In most cases, a central database will encrypt passwords once received using the same key. If the system is successfully hacked, hundreds—if not thousands—of user accounts with sensitive information such as SSNs, credit card numbers, etc. can be compromised. Such authorities therefore spend inordinate amounts to ensure their central databases are secure and to maintain their reputations.

There remains a need to securely manage multiple user passwords without increasing complexity for the user. There is also a need to bring "best practices" for information security used by large organizations to the user level. In addition, a need exists to facilitate user control over credentials and other personal information.

SUMMARY OF THE INVENTION

The above needs can also be addressed using single user sign-on (SSO) that performs local encryption and decryption of user credentials using a "multi-layered" security approach and provides decentralized credential management. Such decentralized password management only requires a user to log in once, enables easy access and management of user accounts, saves time, is convenient, and highly secure.

Disclosed are various methods for decentralized password and credential management. In general, a user creates an account and enters a username/password onto a central login website. The password is immediately hashed and further used to encrypt a one-time random number generated for the user by the central login server. The encrypted random number is then used by the browser to encrypt the user's personal data and/or credentials. Credential management is thus decentralized in that encryption and decryption of the user's personal information happens on the user's system. The central login server is used for storage of credentials. The storage can be in a public cloud, private cloud, user local or remote storage, and mobile storage devices (e.g., USB or mobile device).

The present disclosure aims to improves data security in one regard by employing 'best practices' used by large organizations. Best practices employed by the present disclosure include, but are not limited to: encryption recommendations and standards as set forth in Federal Information Processing Standards (FIPS): 180-1, 180-2, 140, and 197 as incorporated herein by reference; secure hash algorithm: SHA-1, SHA-2, SHA-512, HMAC, AES-128 and AES-256 as incorporated herein by reference; SSL/TLS, strong cryptographic random generators; one time passwords; time-stamps; etc. Data security is also improved by providing multiple security layers and one-way encryption algorithms.

To add yet another layer of security, encrypted user data or credentials may be distributed and stored in one or more locations. For example, the encrypted data may be stored on one or more servers or databases. Such data may also be distributed and stored using any type of public or private cloud hosting platform or service—saving cost, providing reliability, and improving security. Security is improved because instead of being allowed to access several user's information in one location, the data is dispersed. As a result, a potential hacker must first know where to go to gather all the data. Secondly, to obtain hundreds of passwords, a hacker must access each user device and figure out a different key for each user.

During initial registration with the login server, the user downloads instructions to their browser and goes to the login server website. The user enters a username and password in their browser. Additionally, the user may also provide an answer to a security question to serve as a back-up in the event the password is forgotten. The password (and security question answer) is immediately hashed and salted by the browser and sent to the login server over a secure channel. The login server or a software on user's system, in turn, generates a one-time random number for each user. This one-time random number is encrypted with the user's password hash (and security question answer) and provided to the browser in an encrypted form. Instructions on the browser further encrypt the user's other information and credentials using the password-encrypted one-time random number. The user's encrypted other information is sent to the login server to be stored by one or more servers and/or databases. The next time a user logs in to the login server, the hashed password is validated by the login server or by a software on user's system. Upon validation, the user receives his encrypted credentials and other information. The credentials are decrypted with the password on the browser to reveal the one-time random number, and the one-time random number is then used to decrypt the credentials.

Advantageously, a "multilayered security" approach is used where a one-time random number is generated, encrypted with the user's hashed password on one device, and the user's credentials encrypted with the encrypted one-time random number on another device. In addition, communication between the user's browser and the login server takes place over one or more secure channels (SSL/TLS, IPsec, VPNs, etc.). Various protocols used in the single sign-on and encryption process include, but are not limited to: OpenID, SAML, OAuth, Kerberos, AES-128, AES 256, SHA-1, SHA-2, SHA-512, HMAC, or the like. In addition, a combination of standard or non-standard authentication protocols may also be used. The other user information may include: URI information and associated credentials, personal documents, and more. It is appreciated that the encrypted other user information may be stored by one or more servers and/or databases until needed by the user. In this way, the user can have access to his personal information, credentials, documents, etc. virtually anywhere. The next time a user enters his password into the browser and is validated by the login server, relevant encrypted data is conveniently provided to the user's system. The browser instructions use the entered password to decrypt the credentials or other data and obtain the one-time random number (also known as key encryption key). In turn, the one-time random number is used to decrypt the actual data. The user's credentials are automatically provided to websites the user desires to access by the browser. It is appreciated that once the user enters his single password and is validated/logged in, the process disclosed herein appears "seamless" to the user and only takes a number of seconds.

Among its several aspects, the present disclosure accordingly recognizes a need for providing decentralized password and credential management with minimal burden to the user. It is recognized that the user may be logged in different ways (according to convenience, preference, cost, capabilities, etc.) and therefore should not be considered to be limited by the described implementations. In some examples, the user may be logged in by going to a website first and being connected to the login server, by first going to a login website or portal, or by being "automatically" logged in e.g., via a digital certificate. According to one preferred embodiment, the login website presents the user with multiple icons representing websites the user may automatically log on to by simply "clicking" the icon. Such websites may be previously registered with the login server and/or user device. When the user clicks on one of the icons, instructions on the browser obtain the user's encrypted credentials associated with that site. The instructions decrypt the user's credentials and automatically provide them to the site.

According to another aspect of the disclosure, a method for decentralized single sign-on to a plurality of websites via instructions executed by a user computer browser is disclosed. Initial registration steps performed by the browser include: establishing a secure session with a login server; receiving a username, password and security question answer; hashing and salting the user's password and security question answer; receiving a one-time random number generated by the login server and encrypted with the hashed password/security question answer; encrypting the user's credentials and other data with the encrypted one-time random number; and submitting the encrypted credentials and other data to the login server to be stored. In embodiments, the encrypted credential and other user data may be stored by one or more servers and/or databases—including a cloud hosting platform. Post registration steps performed by the browser include: receiving the user's password; hashing and salting the password; submitting the hashed password to the login server for validation; receiving the user's encrypted credentials and other data; using the password to decrypt and reveal the one-time random number; and using the one-time random number to decrypt the user's credentials and other data. In the event that a user forgets his password, he may enter the security question answer which may also be used to decrypt the one-time random number. When the user desires to access a website, the browser automatically provides the corresponding credentials to the website allowing the user to be logged in.

According to another aspect, a user browser may be provided with an optical code for single sign-on. The optical code may be a two dimensional code (QR code, bar code), a picture, image, video, etc. In embodiments, optical login methods include inter alia QR-login, Photo-login and Video-login. Such optical codes are used to validate the user and/or provide additional login information.

Advantages of optical codes are that they can carry large amounts of information and optionally do not require the user to use a keyboard or keypad. In embodiments, the user may be provided with a digital certificate or other security tokens embedded in a quick response (QR) code or image. Other advantages of optical codes are that they are password-less and pose minimal burden to the user.

For optical codes such as Photo-login, the user requests access to a website on a desktop and a secure notification is sent to their mobile device. The notification comprises a user recognizable indicia/image. The indicia can include an image of the user, an object—or anything that is known to the user at the time of the login. When the user views the indicia/image on the trusted device, the user can make a decision whether to approve the request. If the user determines the indicia/image is valid, the user authenticates himself by submitting an "Allow" signal to the trusted device. If the user does not recognize the indicia as valid, the user may submit a "Reject" signal.

Here, the user serves as the identity authority. In this aspect, an authentication server is not required and no computerized image recognition algorithms are used. As a result, "false positives," "false negatives," and "robots" are effectively avoided.

For additional security, the user may be requested to further provide a second authentication factor such as: fingerprint, biometrics, facial recognition, iris recognition, voice, password, PIN, email, etc. However, it is understood that such additional factors are not required for authenticating the user in accordance with optical login as disclosed herein.

According to another aspect of the disclosure, the user mobile device serves as a trusted user device.

According to yet another aspect of the disclosure, a non-transient computer readable medium is disclosed. The computer readable medium contains program instructions that when executed by a computer, cause the computer to: enable a user to perform Single Sign On (SSO) or login to one or more websites or resources via a displayed optical code, comprising the steps of: obtaining information regarding an indicated website or resource the user desires to access, wherein the information is obtained from the displayed optical code; and submitting an encrypted, one-time random number, challenge request, and/or other information obtained from the optical code, to the login server for validation; wherein upon validation, the login server automatically logs the user into the website or resource.

In preferred embodiments, the computer corresponds to a trusted mobile device. In some embodiments, the step of obtaining information from the optical code includes reading the optical code with a camera associated with the computer and extracting information regarding the website or resource from the optical code. In other embodiments, the step of obtaining information from the optical code includes displaying an image on a display of the computer and extracting information regarding the website or resource from the optical code. In embodiments, the "resource" may include a computer resource, URI, or a physical resource (such as a door, vending machine, etc.)

According to yet another aspect of the disclosure, a method for enabling a computer user to perform Single Sign On (SSO) or login to one or more websites or resources via a displayed optical code is disclosed. The method comprises the steps of: obtaining information regarding an indicated website or resource the user desires to access over a computer network, wherein the information is obtained from a displayed optical code; and submitting an encrypted one-time random number, challenge request, and/or other information obtained from the optical code, to a login server for validation; wherein upon validation, the login server automatically logs the user into the website or resource.

In preferred embodiments, the computer corresponds to a trusted mobile device. In some embodiments, the step of obtaining information from the optical code includes reading the optical code with a camera associated with the computer and extracting information regarding the website or resource from the optical code. In other embodiments, the step of obtaining information from the optical code includes displaying an image on a display of the computer and extracting information regarding the website or resource from the optical code. In still further embodiments, the method includes the step of receiving a user-authentication-approval signal input from the user within a certain time period after display of the image. In yet further embodiments, the method includes determining whether a public/private key pair exists for the website or resource, and if not: generating a public/private key pair, storing the private key in non-volatile memory of the computer, and sending the public key to a login server. In still further embodiments, the step of encrypting includes digitally signing a one-time random number, challenge request, and/or other information obtained from the optical code or other sources with the private key for the website or resource.

Advantageously, the present disclosure may be applied as multiple security layers as part of an overall account management suite.

Accordingly, the present disclosure offers many attractive solutions to problems associated with centralized storage of passwords, phishing, having to remember different passwords for increasing numbers of online accounts, insecure password practices, and more. In addition, security is improved because user credentials and data are encrypted locally at the user's site with something that only the user knows. The encrypted user credentials and data are further sent over secure channels—affording "end-to-end" security. Moreover, the encrypted data may be stored in a "distributed" fashion using cloud resources. As a result, the barriers for hackers and malicious users to access large amounts of data are substantially increased. Even more, by using secure push/pull technology, a user is provided more control over, and 'just-in-time' access to, his credentials and personal information.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 2b-c illustrate a more detailed implementation where a user goes to a login server website for single sign-on.

FIG. 3b-c illustrate a more detailed implementation where a user goes to a website first for single sign-on.

DETAILED DESCRIPTION OF THE INVENTION AND PREFERRED EMBODIMENTS

Reference will now be made in detail to various exemplary embodiments of the invention, examples of which are illustrated in the accompanying drawings. The following detailed description describes certain embodiments of the invention, and should not be considered as limiting the invention to those embodiments. In addition, it is understood that "a" refers to one, or more; and that the terms "user device" and "user computer" are referenced interchangeably. It is further appreciated that "user computer" or "user device" also encompasses background processes, web-services, etc. that can perform Single Sign-on and is therefore not limited to single sign-on for individuals or websites.

Figure 1:
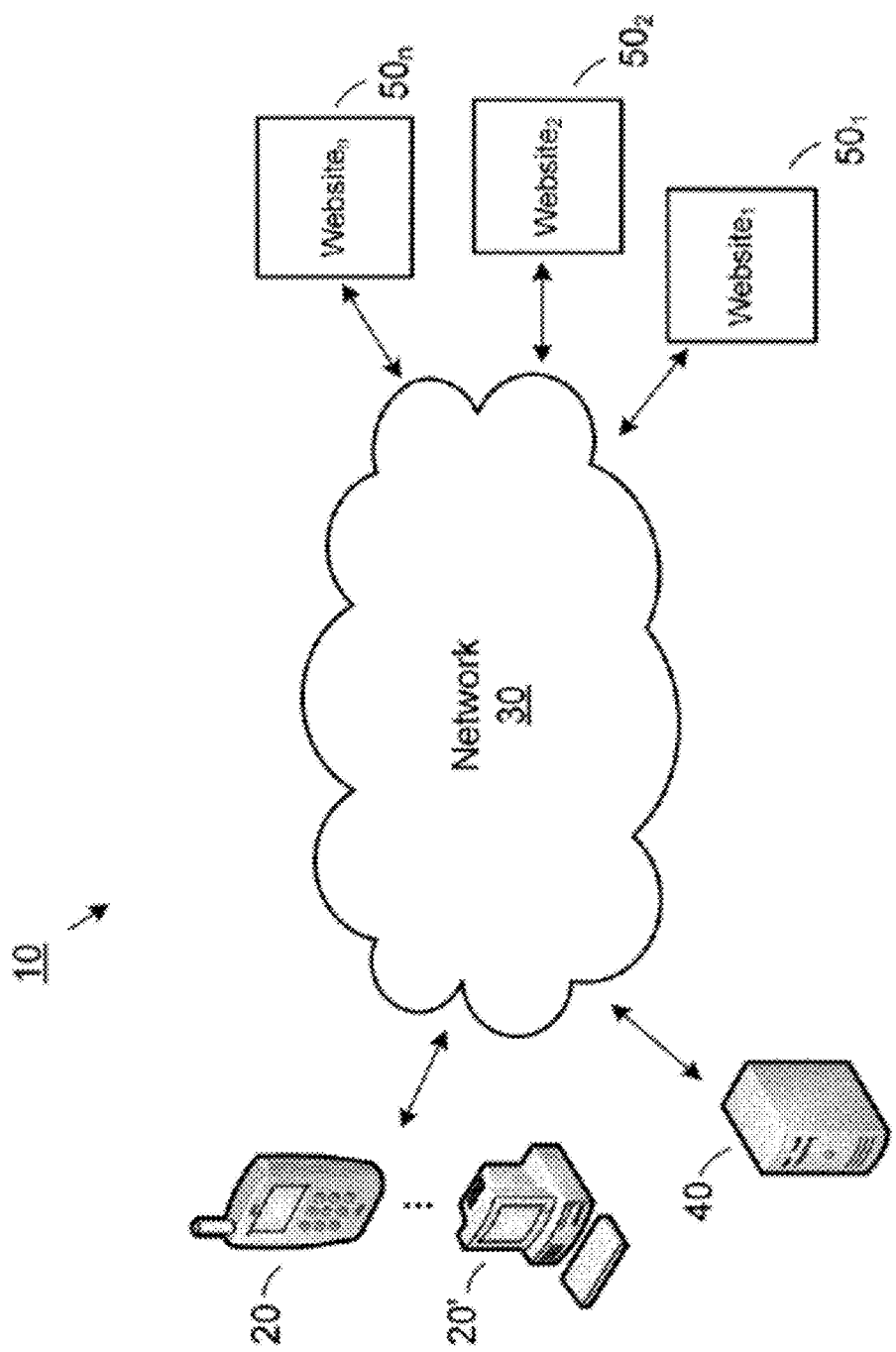
FIG. 1 illustrates a basic exemplary network environment that includes a user computer, login server, and a plurality of distributed websites and corresponding servers.

Turning now to the figures, which depict various exemplary embodiments of the invention, FIG. 1 shows a block diagram of an exemplary system in which the present disclosure may be practiced (as designated by reference numeral 10). As illustrated, the system comprises a user computer 20 communicatively coupled to a plurality of remote servers/websites 40, 50 via network 30. It is appreciated that the user computer 20 may comprise a desktop, PC, laptop, PDA, mobile phone, iPod, iPad, workstation, server, or any other processor-driven or computer device or any device attached to any other processor-driven or computer device like USB. In certain embodiments, the user device 20 is preferably a mobile device. Although depicted as one element in the figure, it is appreciated that user computer 20 represents multiple user computers (i.e., associated with an endless number of users). User computer 20 is addressed in more detail with respect to FIG. 7.

Network 30 may comprise any combination of LANs, WANs, MANs, the Internet, Intranets, private networks, wired and/or wireless (e.g., IEEE 802.11 standard, satellite, cellular, GSM/GPRS, 3G, 4G, CDMA, TDMA) networks, mobile networks, public switched telephone networks (PSTN), SMS, SMSC, MMS, SMTP/MIME and/or IM distribution networks, or any other suitable network arrangements. Communication links (depicted by double arrows) may include transmission links such as wired, wireless, fiber-optic, mobile, and the like. It is further appreciated that Network 30 may also encompass one or more public or private cloud hosting platform or service for data processing and/or storage or other functions.

The login server 40 includes a plurality of processor modules for validating users/devices and managing user accounts. However, it is important to point out that the login server 40 never has access to any of the user's unencrypted credentials or personal identifiable information. It is appreciated that login server 40 may comprise more than one physical or virtual servers in one or more locations. Login server 40 is discussed in more detail with respect to FIG. 9.

Also shown in FIG. 1, are a plurality of distributed websites/resources $50_{1-n}$. These websites may reside on one or more corresponding servers in various network locations. For purposes of this example, websites $50_{1-n}$ require a user to have associated credentials (username, password, PIN, digital certificate, etc.) in order to log in. Such websites may limit access to authorized users such as businesses or organizations and/or include services as online banking, social networking, entertainment, physical access (e.g., through a door), etc.—all of which require certain levels of security.

Figure 2A:
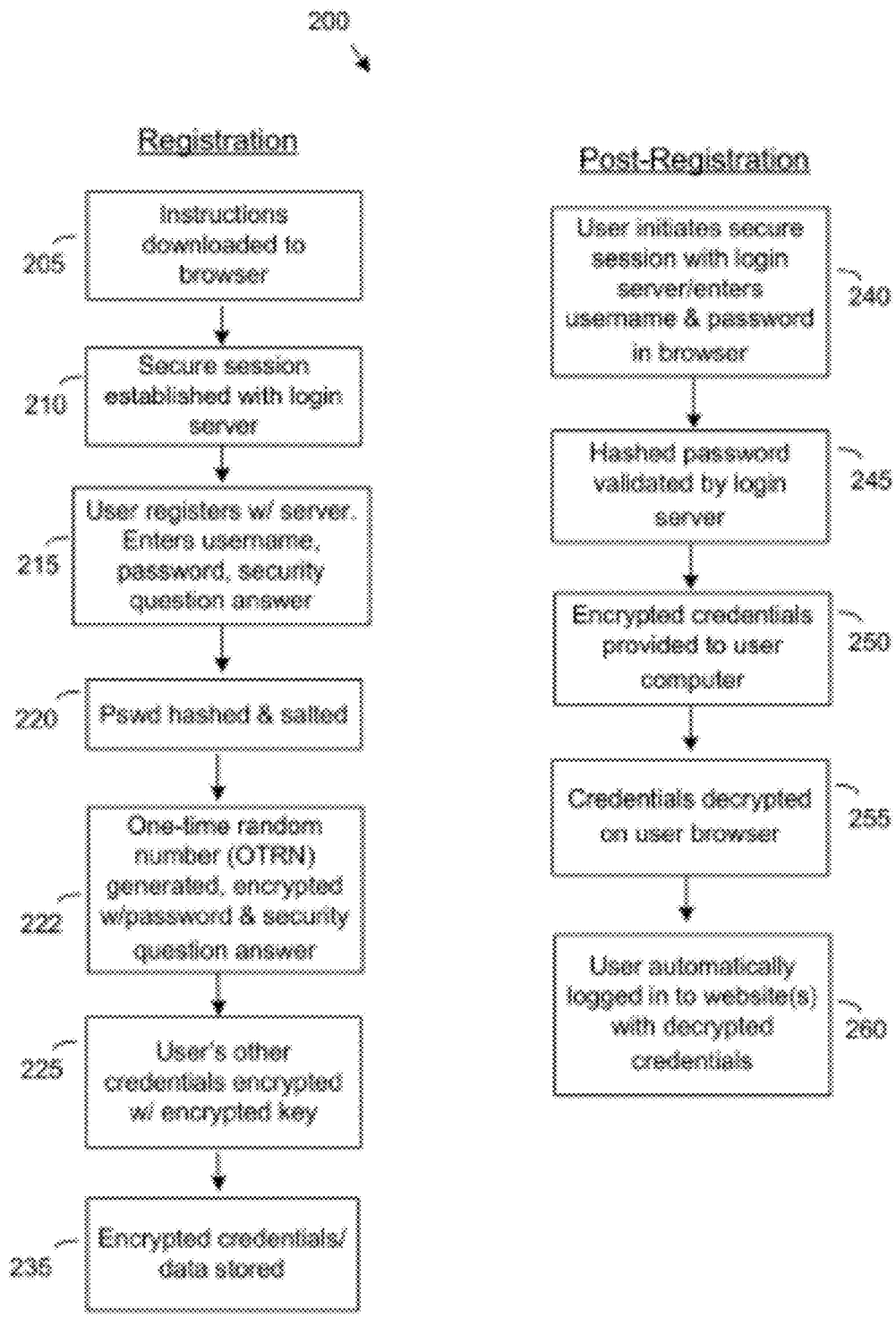
FIG. 2a illustrates an implementation where a user goes to a login server portal to enable single sign-on for multiple websites.

FIG. 2a shows a basic implementation (generally depicted as 200) where a user registers with login server 40 to enable subsequent single sign-on for multiple websites $50_{1-n}$. Steps 205-235 represent initial registration steps with the login server 40. According to step 205, instructions are downloaded to the user computer browser. Such instructions may be downloaded directly from the login server 40, or from another source. For example, a user can go to the login website and the download software instructions, or the user can obtain the software from other download sites. The instructions may take the form of an App, plug-in, add-on, or the like, and enable the user computer browser to perform the disclosed method steps. In step 210, the browser establishes a secure communication session with the login server 40. Examples of secure sessions include, but are not limited to, SSL/TLS, IPsec, and VPNs. In embodiments, the login server 40 creates a user account in a database and points the user to a login page. Preferably, the login server 40 provides the browser with a registration form, and the user enters a username, password, and/or security question answer in step 215. (Instead of the user entering this information, it is possible that the username and password may be computer-generated). Additional information may also be obtained such as the user's first and last name, email address, etc. The password will be used for signing on to all registered applications/websites. In addition, a security question answer provided by the user serves as a back-up in case the user happens to forget their password. As soon as the password is entered into the form, it is encrypted (e.g., hashed and salted) within the browser and provided to the login server 40 (see step 220). In embodiments, the hashing procedure includes: updating the last password change date/time; hashing the password with SHA-512; preparing an HMAC key; and hashing the hashed password again with the HMAC key. Meanwhile, the login server 40 generates a one-time random number for each user. The one-time random number is encrypted with the hashed password and provided to the browser. The instructions on the browser use the password-encrypted one-time random number to further encrypt the user's credentials and other data (including associated websites or URIs) obtained e.g., during the browsing session (step 225). In step 235, the encrypted user credentials and other data are sent to the login server 40 to be stored. It is appreciated that the encrypted data may be stored by the login server 40, and/or by one or more distributed servers and/or databases in communication with the login server 40. In embodiments, the distributed servers and/or databases may be located within one or more computing clouds.

Steps 240-260 represent "post-registration" steps performed between the user computer 20 browser and the login server 40. Once a user has registered with the login server 40, he may go to the login server website (step 240) and enter his login password. (It is appreciated that if it is still the same browsing session, the password is stored in memory on the browser and the user does not need to re-enter his username and password). If it is a different browsing session, and the user is not yet logged in, once he enters his username and password the login server searches for the username. If the username is found, the hashed password is compared with the stored hashed password. (step 245). Upon validation by the login server 40, the user's encrypted credentials and data are provided to the user computer 20 (step 250). Instructions on the user's browser use the entered password to decrypt and reveal the one-time random number, which in turn, is used to decrypt the user website credentials/data (step 255). If the user desires to access a website requiring authorization, the browser seamlessly provides the user's data/credentials to the website such that the user is "automatically" logged in (step 260)—without having to type in any additional passwords.

Figure 2B:
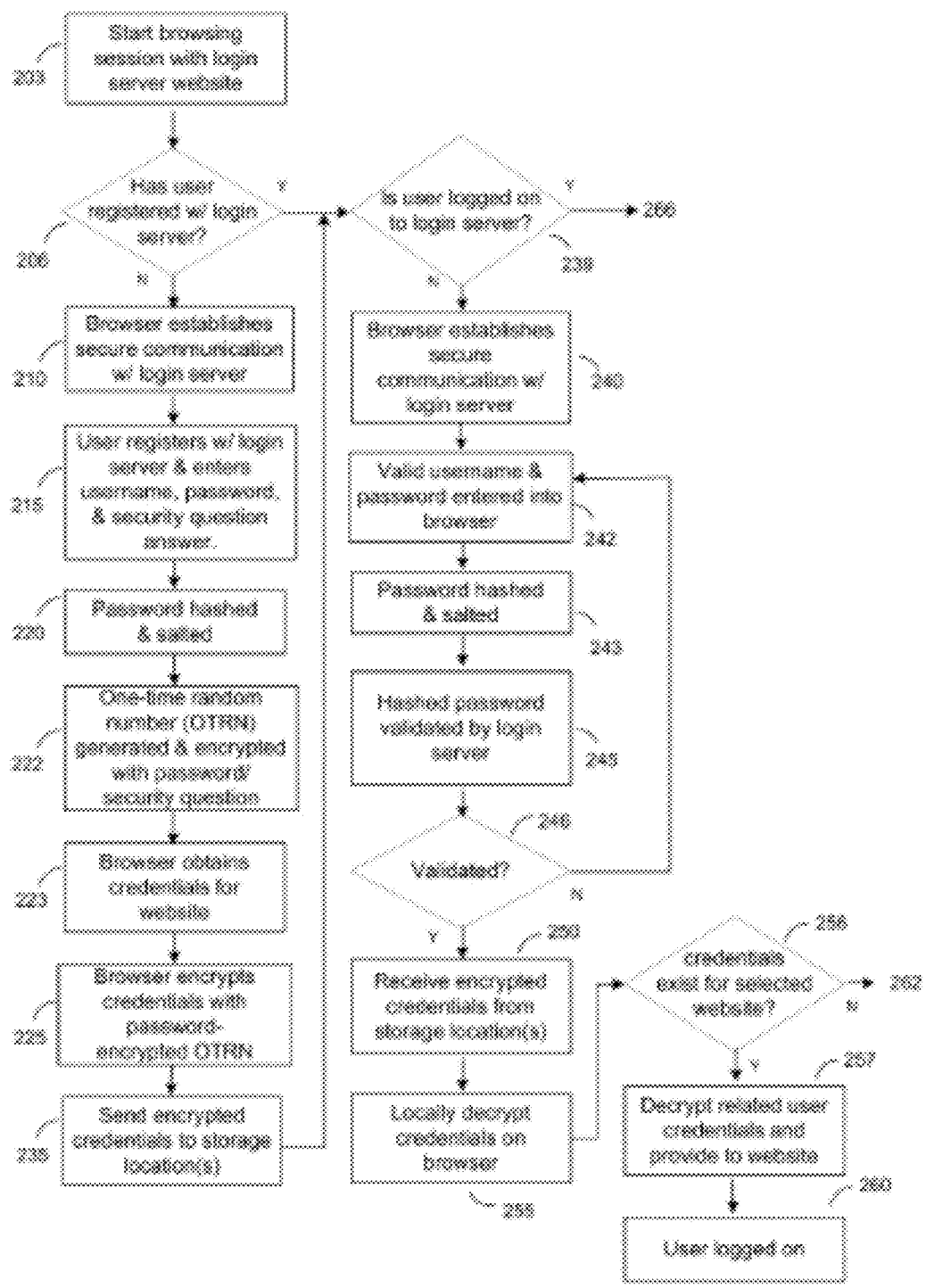
Figure 2C:
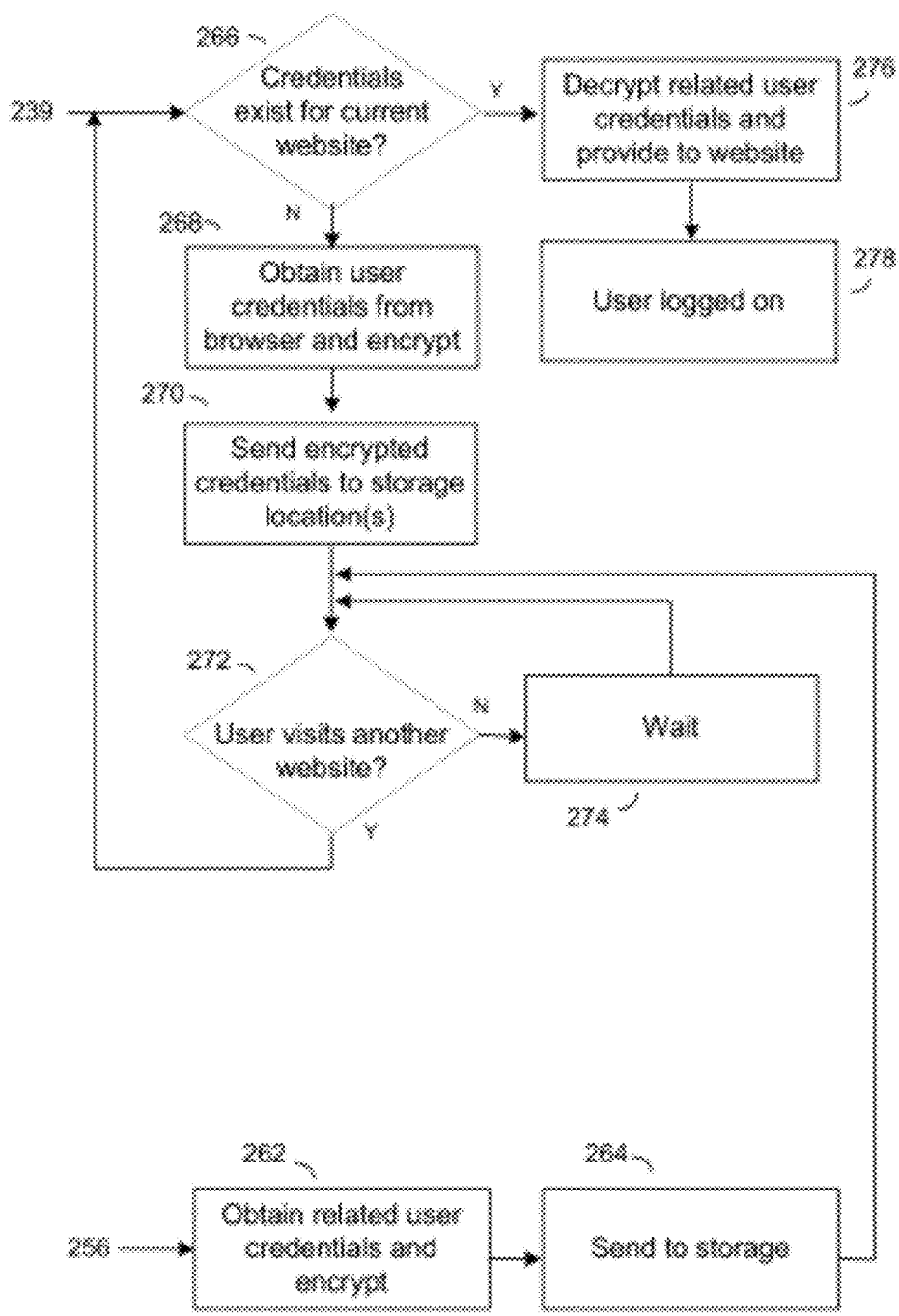

FIGS. 2b-c illustrate a more detailed implementation of the steps shown in FIG. 2a. Beginning at step 203, the user computer browser initiates a session with the login server website. A determination is first made at step 206 whether the user has previously registered with the login server. If the user has not been registered, a secure communication session (e.g., SSL/TLS) is established with the login server 40 (step 210). The user enters a username, password and optionally a security question answer into an online form (step 215). The password is immediately hashed and salted by the user browser in step 220 and submitted to the login server 40 to be stored. In embodiments, the hashing procedure includes: updating the last password change date/time; hashing the password with SHA-512; preparing an HMAC key; and hashing the hashed password again with the HMAC key. The login server 40 further generates a one-time random number for the user. In step 222, both the one-time random number and security question answer are encrypted with the hashed password (step 222). In step 223, the browser obtains user credentials (associated with certain websites/URIs) and other user information. The user (e.g., website) credentials are locally encrypted on the browser using the hashed password-encrypted one-time random number obtained from the login server 40 (step 225). In step 235, the encrypted credentials/user data are sent to one or more storage location(s). It is appreciated that the storage location(s) may comprise one or more servers and/or databases, and in embodiments, one or more cloud computing systems, or the user's local disk storage or mobile storage.

However, if the user has previously registered with the login server 40, another determination is made as to whether the user is currently logged on (step 239). If the user is not logged on, a secure communication session is established with the login server 40. See step 240. A valid username and password are obtained in step 242, and the password hashed and salted (step 243). In step 245, the browser requests validation of the hashed password from the login server 40. If the received encrypted password matches the stored encrypted password, the user is validated by the login server 40 at step 246. In addition, it is appreciated that a combination of proprietary or non-proprietary Authentication protocols may also be implemented here. If the password/user is not validated, a valid username and password are requested again (step 242). Upon validation, the login server 40 allows the user's encrypted credentials and other data to be sent to the user's browser from the one or more storage locations (step 250). In step 255, the user's browser uses the password to decrypts the one-time random number which is then used to decrypt the user's credentials and other data.

Optionally, in step 256, a determination is made as to whether the decrypted data includes the current website. If the URI information is found, then relevant user credentials are decrypted by the browser and provided to the desired website (see step 257). As a result, the user is "automatically" logged into the website (step 260). If URI information for the website is not found, the URI and any associated user credentials are obtained and encrypted by the browser for the next time (step 262). The encrypted information is subsequently sent to one or more storage locations in communication with the login server 40 (step 264). It is appreciated that the storage location(s) may comprise one or more servers and/or databases, and in embodiments, one or more cloud computing systems.

On the other hand, if it is found that the user is already logged on to the login server at step 239, another determination is made whether a URI has been stored for the current website (266). If a URI does exist, the browser decrypts any related user credentials (using the password and recovered one-time random number) and provides them to the desired website to automatically log the user in (steps 276, 278). If however, a URI does not exist for the current website, any URIs or user credentials entered into the browser are encrypted and sent to one or more storage locations for the next time (steps 268, 270). Again, it is appreciated that the storage location(s) may comprise one or more servers and/or databases, and in embodiments, one or more cloud computing systems, the user's local disk storage or mobile storage. In step 272, a determination is made as to whether the user has visited another website. If not, the browser waits until another website has been selected (step 274). If the user has selected another website, the process begins again at step 266.

Figure 3A:
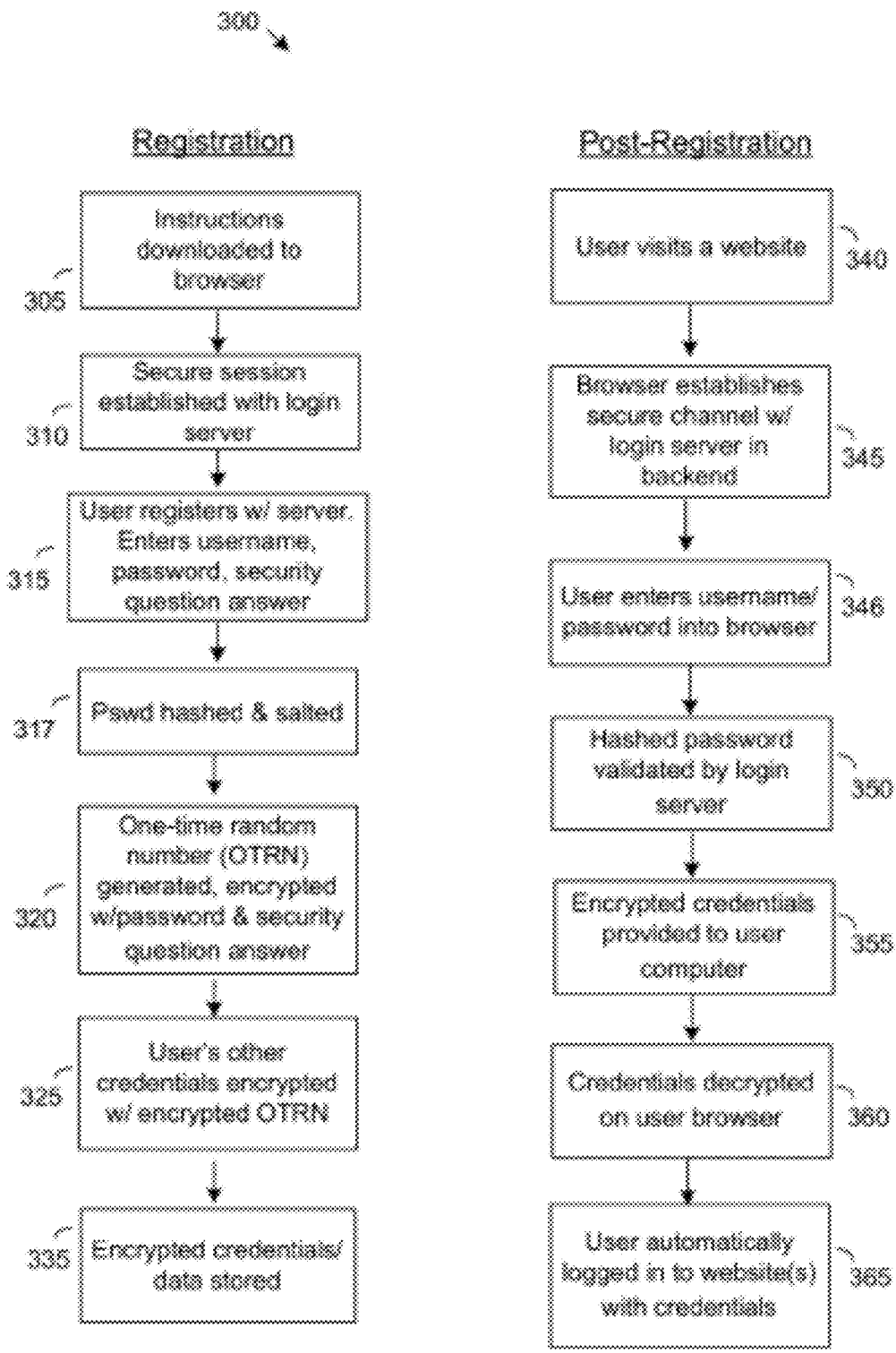
FIG. 3a illustrates another implementation where a user goes to a website and is signed on through the login server.

FIG. 3a shows a basic implementation 300 where a user is able to go to a website and be connected with the login server in the background for single sign-on. Here, initial registration steps 305-335 are similar to the implementation of FIG. 2a. In step 305, instructions are downloaded to the user computer browser. (It is appreciated that the instructions may be downloaded directly from the login server 40, or from another source). The instructions enable the user computer browser to perform the disclosed method steps and may take the form of an App, plug-in, add-on, or the like. In step 310, a secure session is established with the login server website 40 and the user enters a username, password and security question answer into a form presented on the browser (step 315). The password is immediately hashed and salted on the user browser before being submitted to the login server 40 (step 317). In step 320, the login server generates a one-time random number for the user and encrypts it with the security question answer and hashed password. The instructions on the user's browser subsequently encrypt the user's credentials and select other user data (including URIs associated with the credentials) using the hashed password-encrypted one-time random number (step 325). According to step 335, the encrypted credentials and other data are sent to the login server to be stored. It is understood that the encrypted data may be stored by the login server 40, and/or by one or more distributed servers and/or databases. In embodiments, the distributed servers and/or databases may be located within a computing cloud.

"Post-registration" steps 340-365 are different from the implementation of FIG. 2a in that once a user has registered with the login server 40, he may go directly to any registered website 50$_n$ (i.e., a website for which credentials have been obtained and stored). See step 340. The user enters his single sign-on password into his browser and a secure communication session with the login server 40 is established in the backend. See step 345. In step 350, the hashed password is validated by the login server 40. Here it is appreciated that other proprietary or non-proprietary Authentication protocols may also be used. Upon validation of the password/user, the user's encrypted credentials and other data are provided to the user computer 20 (step 355). The user's browser decrypts the user website credentials/data in step 360 using the password and recovered one-time random number. The browser provides the user's credentials/data to the website 50$_n$ such that the user is automatically logged in (step 365)—without having to type in an additional password.

Figure 3B:
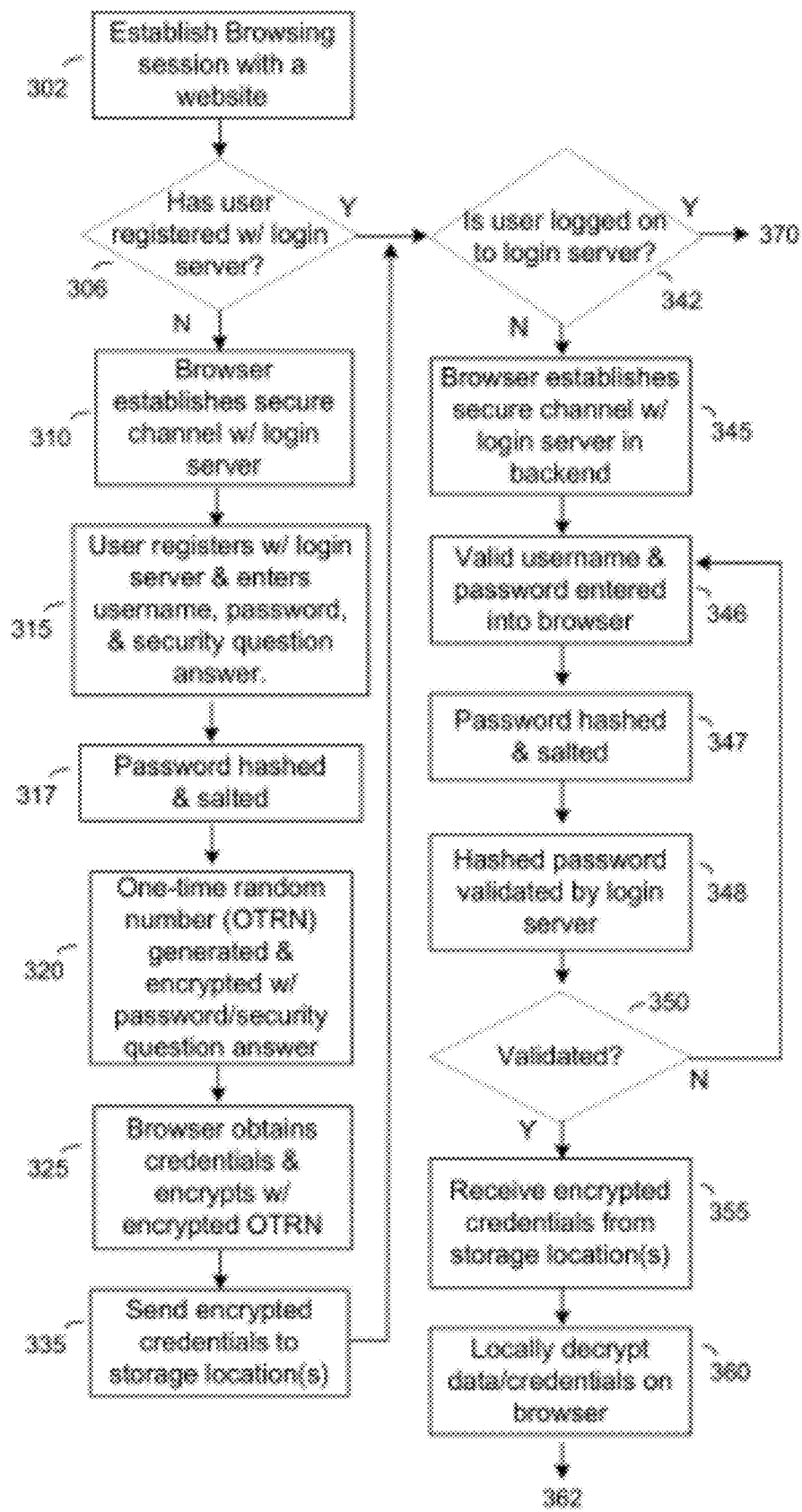
Figure 3C:
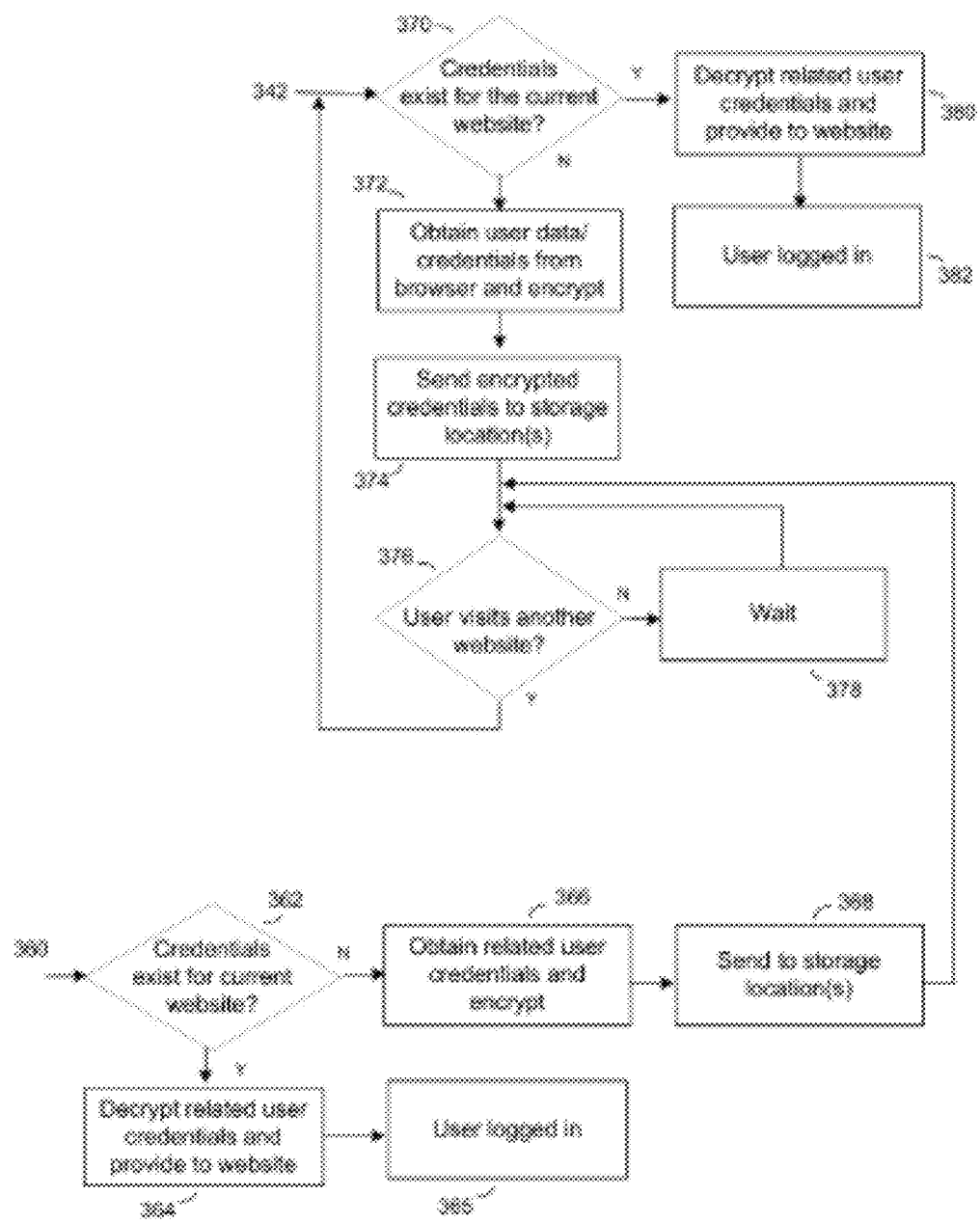

FIGS. 3b-c illustrate a more detailed implementation of the steps shown in FIG. 3a. Beginning at step 302, the user computer browser starts a browsing session with a website 50$_n$. A determination is then made at step 306 whether the user has previously registered with the login server 40. If the user has not been registered, the browser establishes a secure communication session (e.g., SSL/TLS, IPsec, etc.) with the login server 40 (step 310). The user registers with the login server 40, and establishes a username, password, and security question answer (step 315). The password is immediately hashed and salted by the browser before being submitted to the login server 40 (step 317). In step 320, the login server 40 generates a one-time random number for the user which is encrypted with the hashed password and security question answer. In step 325, the browser encrypts select the user's website credentials and other data (including URIs associated with the credentials) with the password-encrypted one-time random number. The encrypted user data and credentials are then sent to one or more storage location(s) (step 335). It is appreciated that the storage location(s) may comprise one or more servers and/or databases, and in embodiments, one or more cloud computing systems or the user's local disk storage or mobile storage.

On the other hand, if the user has previously registered with the login server 40, a determination is made whether the user is currently logged on (step 342). If the user is not logged on, the user computer browser establishes a secure communication session with the login server 40 in the backend. See step 345. In step 346, the user enters his username and password into the browser. The password is immediately hashed and salted (step 347) and validated by the login server (steps 348, 350). If the hashed password matches the stored encrypted password and/or other authentication conditions are met, the password/user is validated by the login server 40. If the user is not validated, a valid username and password are requested again (step 346). Upon validation, the login server 40 causes the user's encrypted data and credentials to be sent to the user's computer from the one or more storage locations (step 355). The user's browser decrypts the received website credentials and other data in step 360 using the password and recovered one-time random number.

In step 362, a determination is made as to whether the decrypted user data includes credentials for the current website. If the credentials are found, the browser provides them to the desired website. See step 364. As a result, the user is automatically logged into the desired website (step 365). However, if credentials for the website are not found, any user data and associated user credentials are obtained and encrypted by the browser for the next time (step 366). The encrypted data is subsequently sent to one or more storage locations (step 368) which may comprise one or more servers and/or databases, and in embodiments, one or more cloud computing systems.

If the user is already logged on to the login server, a determination is made as to whether credentials have been stored for the current website (370). If credentials do exist, the browser decrypts any related user credentials and provides them to the desired website $50_n$ to automatically log the user on (steps 380, 382). If credentials do not exist for the current website, any credentials entered into the browser are encrypted with the password-encrypted one-time random number and sent to one or more storage locations for further reference (steps 372, 374). Again, it is appreciated that the storage location(s) may comprise one or more servers and/or databases, and in embodiments, one or more cloud computing systems. In step 376, a determination is made as to whether the user has visited another website. If not, the browser waits until another website has been selected (step 378). If the user has selected another website, the process begins again at step 370.

Optical Login

Figure 4A:
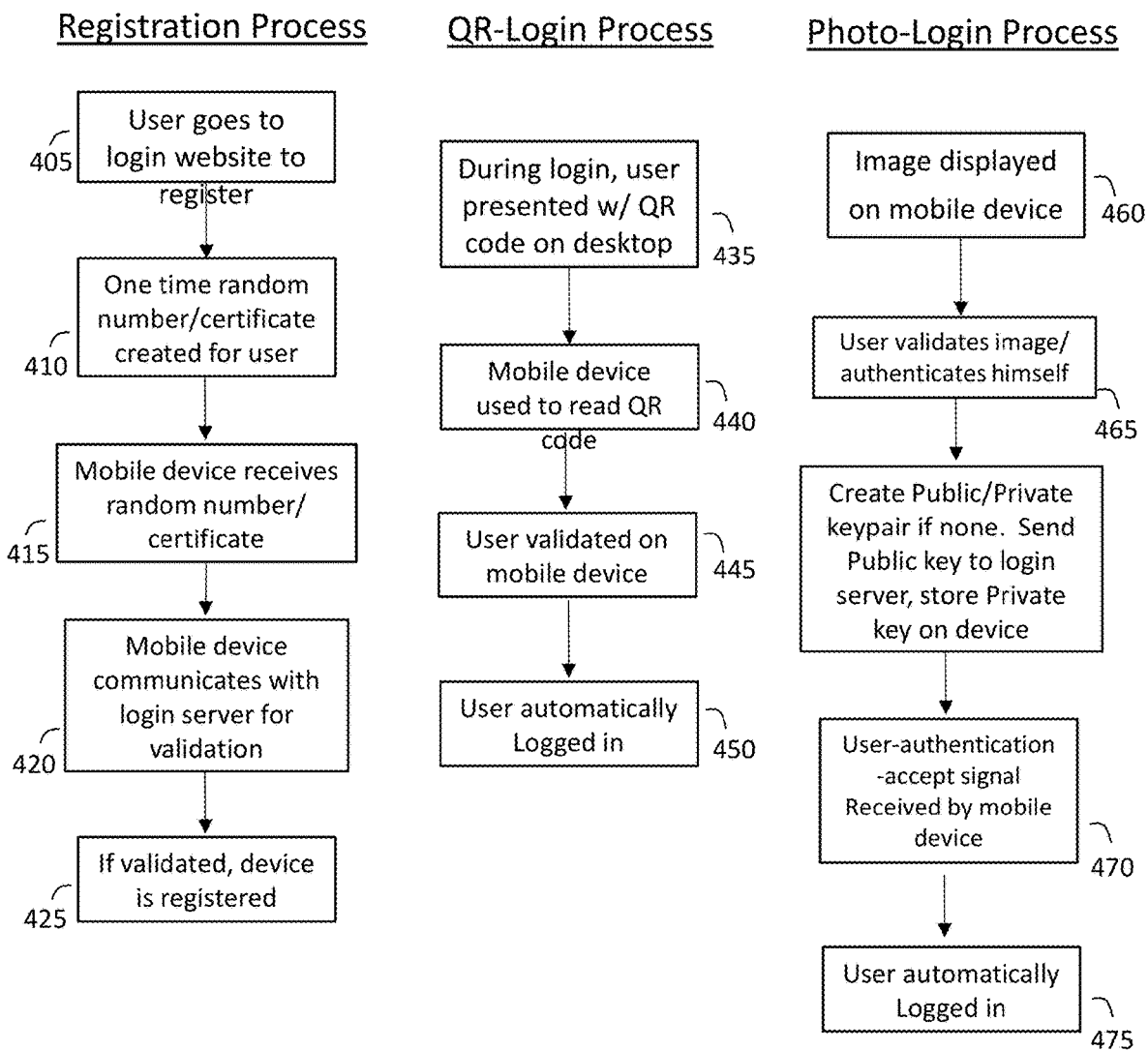
FIG. 4a illustrates yet another implementation where a user registers with a login server and logs in using optical code(s).

According to other aspects of the disclosure, optical codes may be used to register and/or log in a user (see FIG. 4*a*). Preferably, here the user computer 20 corresponds to a mobile device and the user is attempting to access a website/resource (e.g., on a desktop 20'). Generally speaking, the user downloads instructions (e.g., an App) on his mobile device browser and registers his mobile device 20 with the login server 40 website. The login server 40 creates a one-time random number and/or digital certificate (e.g., X.509) for the user. The mobile device 20 receives the digital certificate/one-time random number over a secure channel and stores it in non-volatile memory (25). In an even further embodiment, the digital certificate is embedded in an optical code. The mobile device 20 may either receive the optical code using a scanner/camera on his mobile device 20, or the optical code may be pushed to the mobile device 20.

Secure channels include, but are not limited to: SSL/TLS, Ipsec, VPN, email, or SMS. Examples of optical codes include, but are not limited to: bar codes, quick response (QR) codes, pictures, images, video or any type of visually recognizable indicia. After the user's mobile device 20 obtains the digital certificate, for example, it may communicate with the login server 40 in the backend to be validated/authenticated before being registered. Again, it is appreciated that authentication and/or authorization of the mobile device 20 may happen behind the scenes using any standard or non-standard authentication protocols.

Figure 4B:
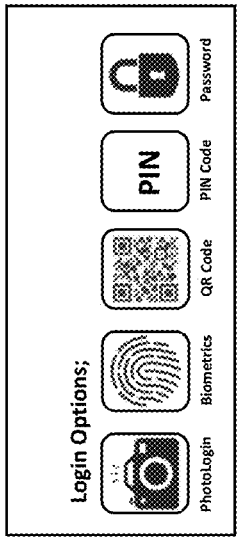
FIG. 4b illustrates a user device display showing different login options available to the user.

The next time the user goes to login to on his desktop device 20', he is presented with a login page (see FIG. 4*b*) comprising a variety of different optical login options 430 including inter alia QR-login and Photo-login. Other login options may also be provided here, such as biometric login, PIN login, password login, etc. In alternative embodiments, the presented options may be used as second authentication factors ("2FA") to further improve security. Advantageously, optical login methods allow a user to log in more securely and almost effortlessly using their mobile device 20.

Generally regarding optical login, the mobile device 20 receives a notification from desktop device 20' comprising (e.g., session) data embedded in a QR code or an image. In turn, the mobile device 20 signs the notification data and thereby verifies the device to the login server 40.

In some embodiments, optical codes are analogous to UserIDs—except that QR codes and images can contain exponentially more information. In this way, additional data layers may be provided to uniquely identify the user and/or the session. In contrast to traditional UserIDs and passwords, the disclosed QR codes and images may be newly generated each time the user logs in. In embodiments, the image/indicia may include video, incorporate a wave pattern, etc.

According to embodiments, the user may additionally be requested to enter a password, PIN, biometric input into the mobile device (step 437). This helps to add yet another layer of security. Because only the user can provide the PIN (something only he knows) or biometric input (something only he has), the user is effectively validated and paired to the mobile device.

Once the user is paired to the mobile device 20, and the mobile device 20 is paired to both the desktop 20' and login server 40, the user is automatically logged in to the desired website or resource.

Registration Process

FIG. 4*a* shows method steps (405-425) for initially registering a user mobile device 20 with login server 40, however should not be taken to be limiting, but rather exemplary, in nature. Steps 405-425 are performed when user device 20 first registers with the login server 40. In step 405, the user goes to the login website to register. A one-time random number or digital certificate is generated for the user by the login server 40 (step 410). In step 415, the user device 20 receives the certificate/one-time random number over a secure channel (such as SSL/TLS, Ipsec, VPN, email, SMS, etc.). Additionally or alternatively, the digital certificate is embedded in an optical code. Examples of optical codes include: bar codes, quick response (QR) codes, pictures, images, video, etc. Upon receipt of the digital certificate/one-time random number, the mobile device 20 communicates with the login server 40 in the background for validation (step 420). Upon validation, the mobile device 20 is registered and/or paired with the login server 40 (step 425).

The next time the user wants to log in to a website or resource $50_{1-n}$ on his desktop 20', he is presented with various login options 430: QR-login, Photo-login, biometric login, PIN login, password login, etc. See FIG. 4*b*. QR-login and Photo-login are examples of optical login via mobile device 20.

QR Login Process

Generally in the case of QR-login, the desktop 20' displays a QR code containing data about the login session (step 435). The user reads the QR code with the mobile device 20 to obtain session information and/or other information (step 440). The mobile device 20 signs the session information with a private key and provides the result to the login server 40. In step 445, the mobile device 20 is validated by the login server and automatically logged in (step 450).

Figure 4C:
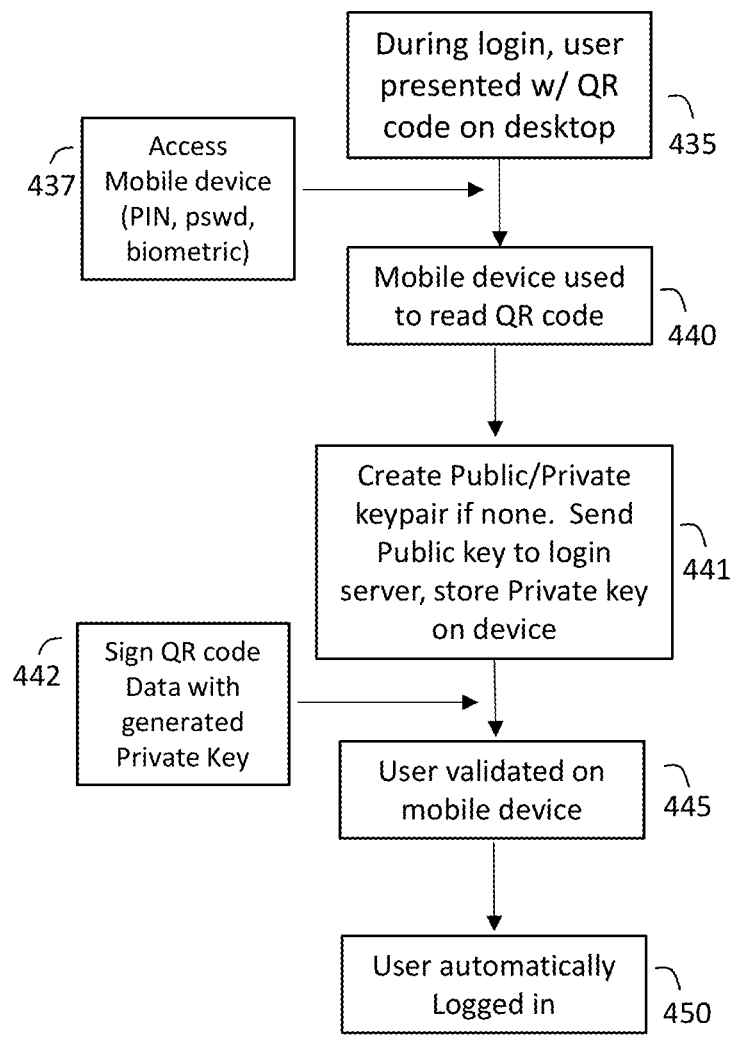
FIG. 4c illustrates steps for QR-login in accordance with the disclosure.

FIG. 4c shows the QR-Login process according to a further embodiment. In step 435, the user is presented with a QR code. Before the user reads the QR code, he securely accesses the mobile device 20 by entering a PIN, password, fingerprint, retinal scan, or the like (step 437). In this way the user is effectively validated and paired to the mobile device 20.

After the QR code is read by the mobile device 20, the mobile device 20 checks to see if a public private key pair has been generated for this site. If not, corresponding public and private keys are generated. The private key is stored on the mobile device 20 in non-volatile memory 25 and the public key is sent to the login server 40 (step 441). If public/private keys exist for the site, the mobile device 20 signs information from the QR code and submits to the login server 40 (step 442). If the login server 40 is able to successfully sign the information with a corresponding public key, the user device 20 is validated (step 445) and the user automatically logged in (step 450). In this way, the mobile device 20 is effectively paired to the website on desktop 20'.

PhotoLogin Process

Photo-login is an optical login alternative to QR login. Generally, in the Photo-login process, an image/indicia is displayed on the mobile device 20 (step 460). If the image/indicia is something that the user recognizes, the user validates the image and authenticates himself by entering a user-authentication-accept signal in the mobile device 20 (steps 465, 470). In step 475, the mobile device 20 communicates with the login server 40 and the user is automatically logged in to the website/resource (e.g., on desktop 20').

Figure 4D:
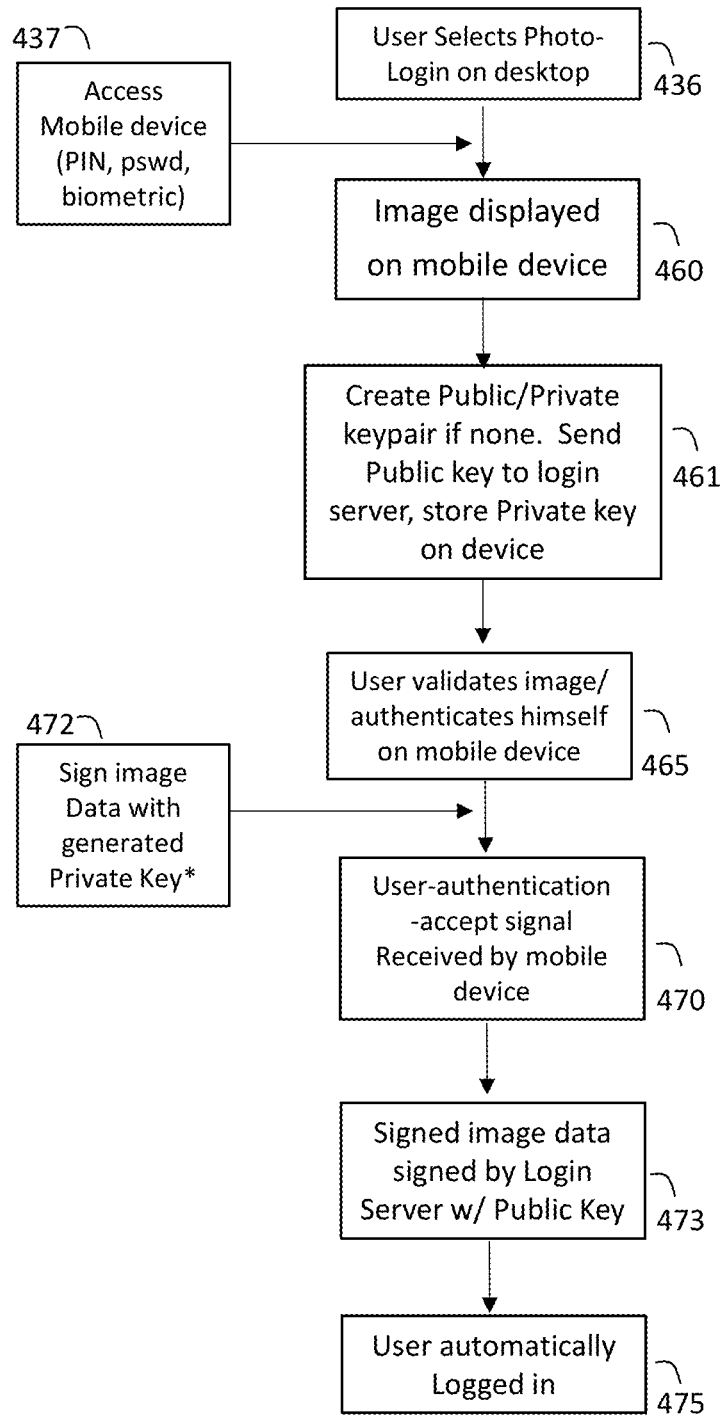
FIG. 4d illustrates steps for Photo-login in accordance with the disclosure.
Figure 4E:
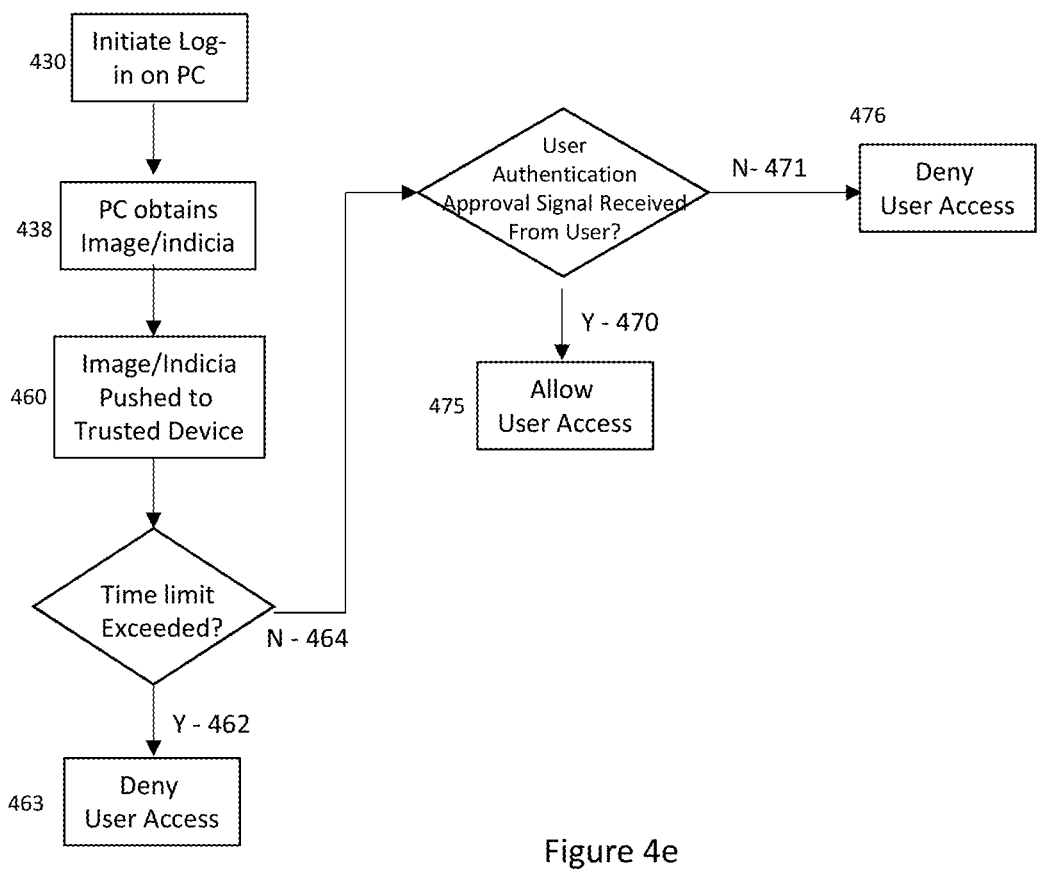
FIG. 4e illustrates alternative/additional steps for Photo-login in accordance with the disclosure.

FIGS. 4d and 4e show the Photo-login process according to further embodiments. As mentioned, when a user goes to log in to the desktop, he is presented with various login options (430). In this case, the user selects Photo-login (step 436). In step 437, the user securely accesses the mobile device 20 by entering a PIN, password, fingerprint, retinal scan, or the like. In this way, the user is effectively validated and paired to the mobile device 20. In the Photo-login process, an image/indicia is pushed to the mobile device 20 and displayed to the user (step 460). In preferred embodiments, a camera associated with the desktop 20' is instructed to take a photo of the user (or any object that the user would readily recognize) to be displayed on the mobile device 20. The mobile device 20 then checks to see if a public private key pair has been generated for this site. If not, corresponding public and private keys are generated. The private key is stored on the mobile device 20 in non-volatile memory 25 and the public key is sent to the login server 40 (step 461).

In step 465, the image/indicia is validated by the user. The mobile device 20 signs information from the image/indicia with the private key (step 472). In step 465, the user validates the image/indicia and authenticates himself by submitting a user-authentication-accept signal to the mobile device 20 (step 470). The mobile device 20 submits the signed information to the login server. If the login server 40 is able to successfully sign the received information with a corresponding public key, the user device 20 is validated (step 473) and the user automatically logged in to the website/resource (step 475).

In embodiments, the login server 40 embeds a secure token, session data and/or other information in the QR code, image, indicia receive by the mobile device 20.

Once the mobile device 20 is paired with the login server 40 and the user's account, it is added to a pool/rolodex of user's available mobile devices. (When user wants to push notification, he/she can choose from this list and send authentication request to any device on the list). For example, the user logs in to their account on their laptop/desktop 20'. In the user's account dashboard, a list of devices previously used to gain account access is displayed. The user can choose what mobile device to PUSH notifications to (e.g., "Motorola XT1032"). The login server 40 will then PUSH a secure notification to the user's mobile device 20. The user may accept by clicking on "Allow" button, or "Reject" to cancel or disallow this. If the user selects "Allow", the mobile device may become trusted device 20—and/or a mode of delivery for second factor authentication, or 2FA.

Once the user has created an account with the login server 40 and paired the mobile device with the login server 40, subsequent logins are greatly simplified.

In essence, users authenticate themselves using Photo-login/Video-login which is based on displayed indicia that only the user would know or recognize. For example, upon receiving a secure indicia/image on trusted device 20, the user selects whether to "Allow" or "Reject" the login request. In embodiments, to ensure that the indicia/image is secure, it may be authenticated to the login server 40, signed with the user's public key, etc.

FIG. 4e illustrates a further embodiment associated with allowing user access in accordance with Photo-login. When the image/indicia is pushed to the mobile device 20 (step 460), it is displayed for a short time limit to further improve security. If the time limit is exceeded, the image/indicia closes up—and user login/access is denied (steps 462, 463). If the user responds within the time limit (step 464), the user is given the option to deny or approve the image/indicia as discussed below.

In Photo-login/Video-login, the image/indicia pushed to the mobile device 20 means something to the user. For example, a camera on the desktop 20' may be instructed to take a photo of the user at the moment of login. The user would recognize the picture of himself at that moment, and provide a user-authentication-approval signal to the mobile device 20 (step 470). With Video-login, the user can not only say, "it is me"—but has audio as well. According to various embodiments, the user need not be presented with an image of himself, but any object (or orientation of the object) that the user could verify. For example, the user could hold a bottle of water in front of the camera at a 90 degree angle. Upon receiving an image of the water bottle at the particular angle, the user would know the image is valid, and provide a user-authentication-approval signal to the mobile device 20 (step 470). In this way, the user is authenticated by himself and not by an authentication server.

Again, Photo-login and Video-login creates a visual or indicia image that is readily known or recognized by the user. The indicia is not meant to be limiting and may include any image or object including, for example: clothing, a person, a water bottle, a car, bike, bicycle, an object (comb, pencil, paper), flowers, a river, boat, etc. The point is that the indicia or image means something to the user (e.g., where the user was just holding the object in the image, the object was just near the user, the object belongs to the user). Only the user attempting to log in at that moment would be able to recognize and confirm the indicia, and therefore be able to approve the login request.

On the other hand, if the user does not recognize the image, they have the ability to provide a user-authentication-denial signal to the mobile device 20 (step 471) and deny access (step 476).

One advantage of user self-authentication as set forth above, is that sensitive passwords do not need to be stored by a "centralized" server for validating the user. Instead, the user can authenticate himself on his mobile device 20 based on something he already has. In addition, Photo-login does not rely on image analysis or facial recognition algorithms, but is based on something only the user knows. As a result, "false negatives" and "false positives" are avoided and the user need not worry about whether he will be recognized with different background settings.

Additionally, it is appreciated that other "third-party" websites $50_{1-n}$ can partner with the login server 40 to participate in optical single sign-on. According to one implementation, the login server 40 serves to "automate" the user authentication process for these websites $50_{1-n}$. In this case, the "third-party" websites $50_{1-n}$ may separately register with the login server 40 to participate in automatic user authentication. According to another implementation, the "third-party" websites $50_{1-n}$ obtain a copy of the login software/instructions such that all user/device registration takes place with the websites $50_{1-n}$ directly and the login server 40 does not know anything. According to another implementation, the "third-party" websites $50_{1-n}$ integrate with the login server 40 via integration links.

Other applications of optical codes are that of online gaming, network administrator control, parental control, online bank transactions and processing of data and information. For example, the user's mobile device 20 cameras may be pointed to QR codes such that the user's mobile device 20 will interact with the login server 40 or other user devices 20" to communicate and play games. Other uses of QR codes include creation of confidential QR codes by users for conversation, chatting, passing information/data, and more. As another example, two or more users may receive a push notification to their mobile devices and "user-authentication-approval" signals may be needed from the two or more users.

In embodiments, when an online transaction (such as a financial transaction) is required to be approved, a third party site can send a Photo-login transaction verification to the user that allows the user to approve it. Optionally, the bank or other transaction requesting company can store the photo/video as an approval. For example, the financial institution or other party could request the user to send the photo to put it in the file. Additionally, the institution can request a signature and the user could sign the transaction and approval on the mobile device 20. It is possible that the mobile device 20 could take a photo at the time of signing as well. In embodiments, the user enters a user-authentication-approval signal into the mobile device 20 upon approving the optical code and/or transaction. In further embodiments, a user-authentication-approval signal must be received from multiple different users before the optical code can be validated by the login server. As mentioned, a photo and other information (e.g., IP address, geo-location, date/time stamp, device information, etc.) may be obtained regarding the one or more different users approving the optical code and/or transaction. The photos may be obtained by each user's mobile device and submitted along with the other user information to the login server for documentation and/or verification purposes.

In embodiments, a spouse or other person could request emergency access to the user's login account. In this case, the requesting person would be required to make a video (using Video-login or Photo-login) and request access from a desktop at their home. The user could then remotely grant access to the desktop at the remote location for his account.

Illustrative Example-1

The user installs instructions in the form of an Application to his mobile phone 20. During registration, the user may be presented with an X.509 certificate embedded in a QR code on a desktop device 20' and installed on the mobile device 20. The user reads the QR code with his mobile phone 20 which requests validation from the login server 40. Upon validation, the user is automatically logged in and the browser on his desktop device 20' opens up.

Illustrative Example-2

In the case of parental login, both the parent and the child would receive an image that they would recognize (this could also be pre-determined or pre-agreed upon). Approval signals would have to be received from both parties before login to a website could occur. In this way, if the child is attempting to access a website, the parent would receive an image on their mobile device to "approve" or "deny."

Password Beneficiary

As a result of decentralized credential/user information management, a user may submit not only credentials, but other personal information to be securely stored on one or more servers and/or databases. The login server 40 creates an account for each user and knows where to locate all of the user's data—yet does not know what the user's personal data is—because it can only be unencrypted by the user. As mentioned, the user's personal data may include not only credentials, but financial data, legal documents, or anything the user desires to remain private and secure. In some situations, however, it may be desirable to assign one or more beneficiaries to a user's password and/or login account. For example, if a user becomes incapacitated or deceased, it may become necessary for others to access a user's personal data and/or portions of the user's login account. Beneficiaries may include relatives, attorneys, corporate management, trusted friends, etc. In addition, examples of stored data or documents managed by the user's login account include wills, stock certificates, titles, and more. There are various options for assigning one or more beneficiary according to the situation. One beneficiary may be assigned the user's password such that they alone can unlock the user's data in their account. In another implementation, two or more beneficiaries may be assigned such that each can separately unlock the user's data. In a "dual" mode, two or more beneficiaries can only unlock the user's data once all of the beneficiaries have entered their passwords. To conveniently assign beneficiaries, and determine what data each beneficiary can access, the user may use an account management dashboard (see e.g., FIG. 10) provided by the login server 40. The dashboard is a user-friendly GUI that enables the user to easily manage their credentials, documents, data, etc.

Figure 5:
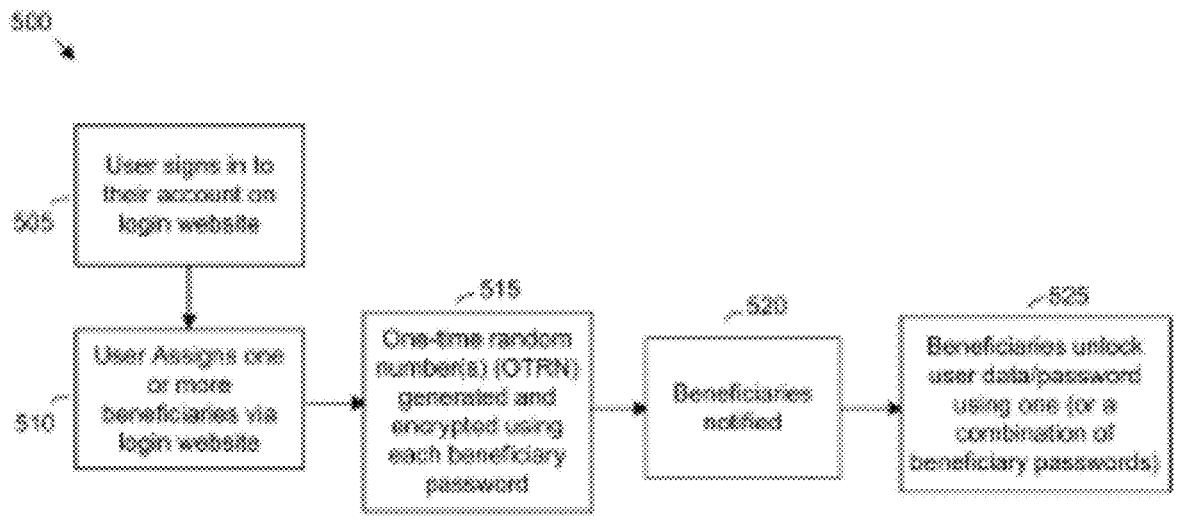
FIG. 5 illustrates another implementation where a user may assign one or more password beneficiaries (or may be known as trusted friends) through the login server.

FIG. 5 shows method steps for assigning one or more password beneficiaries through the login server 40 (as generally depicted by element 500). Assuming the user has already registered with the login server 40 and created a user account, the user signs in to the login server website (step 505). Here, the user is provided a GUI or dashboard (shown in FIG. 10) that enables him to access his account and assign one or more beneficiaries (step 510). Here, the one-time random number generated for the user is encrypted with each beneficiary password (however other variations are possible). See step 515. In step 520, the one or more beneficiaries are notified and provided with instructions for accessing the user's account. Such notification may take place via email, text, their own login account, etc. The beneficiaries may then unlock the user's password and/or designated portions of the user's account (step 525).

Website Membership Management

Another application of the present disclosure is Website Membership Management (WMM). This application facilitates secure management and access of user accounts by websites that sell information or services to customers. For example, video streaming websites can use the login server 40 to securely disseminate data to authorized users. Instead of the user having to enter a separate username and password, the website sends a link to the user's account. The user only needs to click on the link in order to be automatically logged in to the website. In this way, such websites can make the user's life easier while properly addressing licensing issues. According to another implementation, these websites can integrate with the login server 40 via optical images such as QR codes, or the like.

Figure 6:
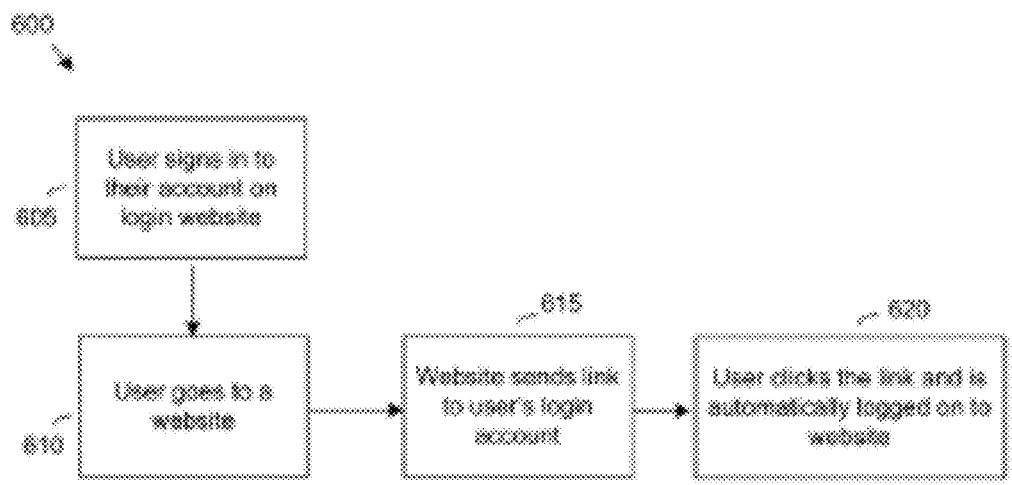
FIG. 6 illustrates yet another implementation where a website that sells data or services may securely distribute content to authorized users via the login server—where access is provided to users by the content owner.

FIG. 6 shows method steps for securely disseminating content to authorized users via the login server 40 (as generally depicted by element 600). Assuming the user has already registered with the login server 40 and created a user account, the user signs on and goes to a website (steps 605, 610). The website sends a link to the user's single login account (615). Thus, instead of having to know a username or password, the user only needs to click on the link and is automatically logged in to the website (620).

Figure 7:
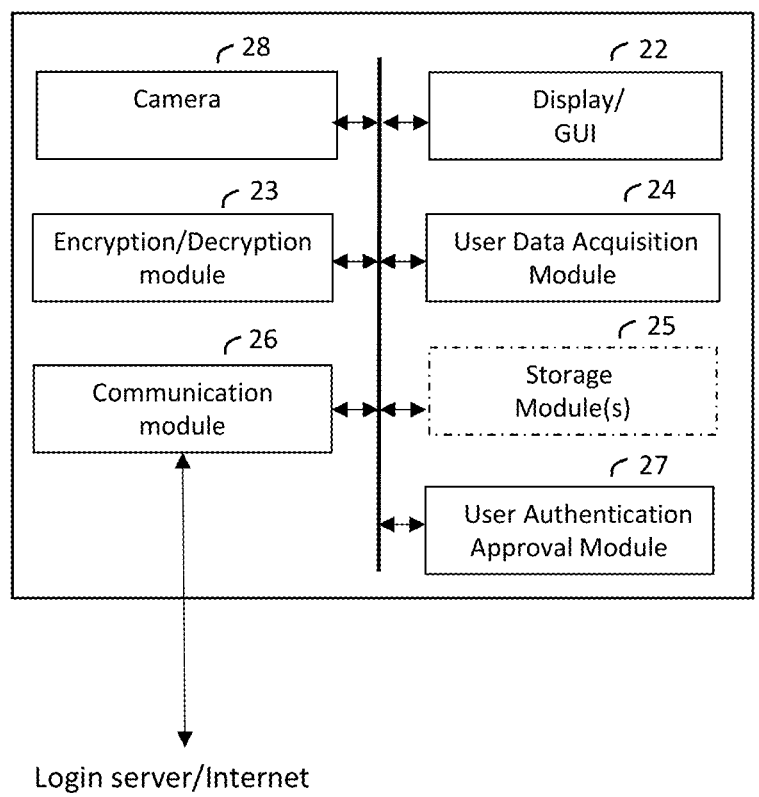
FIG. 7 illustrates an exemplary user computer according to the present disclosure.

FIG. 7 shows an exemplary user computer (20) according to the present disclosure. It is appreciated that the user computer 20 includes a variety of hardware and software. Preferably, the user computer 20 comprises inter alia: a CPU/browser 21, a display/GUI 22, an encryption/decryption module 23, a user data acquisition module 24, storage module(s) 25, a communication module 26, and user-authentication-approval module 27. It is understood that the displayed modules are in communication with one another, e.g., over a bus. The CPU/browser 21 may include one or more processors, a power supply (e.g., connected to a motherboard). Input/output devices (as part of display 22, data acquisition module 24, camera 28, etc.) may include: keyboards, voice input, touch screen, stylus, mouse, display, camera/scanner, etc. The display/GUI 22 preferably displays obtained optical codes to the user. Storage module(s) 25 may include: ROM, hard drives, SD cards, micro SD cards, multimedia cards, SIM cards, compact flash, secure digital, memory sticks, CDs, DVDs, floppy disks, zip drives, tapes, mobile storage devices, and the like. Communication module 26 may include: one or more transmitters and receivers (including antennae) and be in communication with the Internet (and login server 40) over one or more communication networks. Preferably, the encryption/decryption module 23 is configured to perform the encryption algorithm steps of the present disclosure. In embodiments, the encryption/decryption module digitally signs information with a private key stored in storage module 25. User-authentication-approval-module 27 is configured to obtain authentication approval or denial input signals from the user to accordingly approve or deny user login to a website or resource. User computer 20 may also include data interface (s), such as IR, USB, firewire, Bluetooth, etc. (not shown). The user computer 20 also includes a proprietary or open source Operating System including, but not limited to any Windows, UNIX/Linux, or MAC platform (e.g., iPhone 3G or later, Android, etc.), RIM OS, PALM OS, Symbian OS, etc. In addition, the user computer 20 includes a graphical user interface and preferably web browsing capabilities such as provided by Internet Explorer, Firefox, Chrome, Safari, TV, DVR, or the like.

Figure 8:
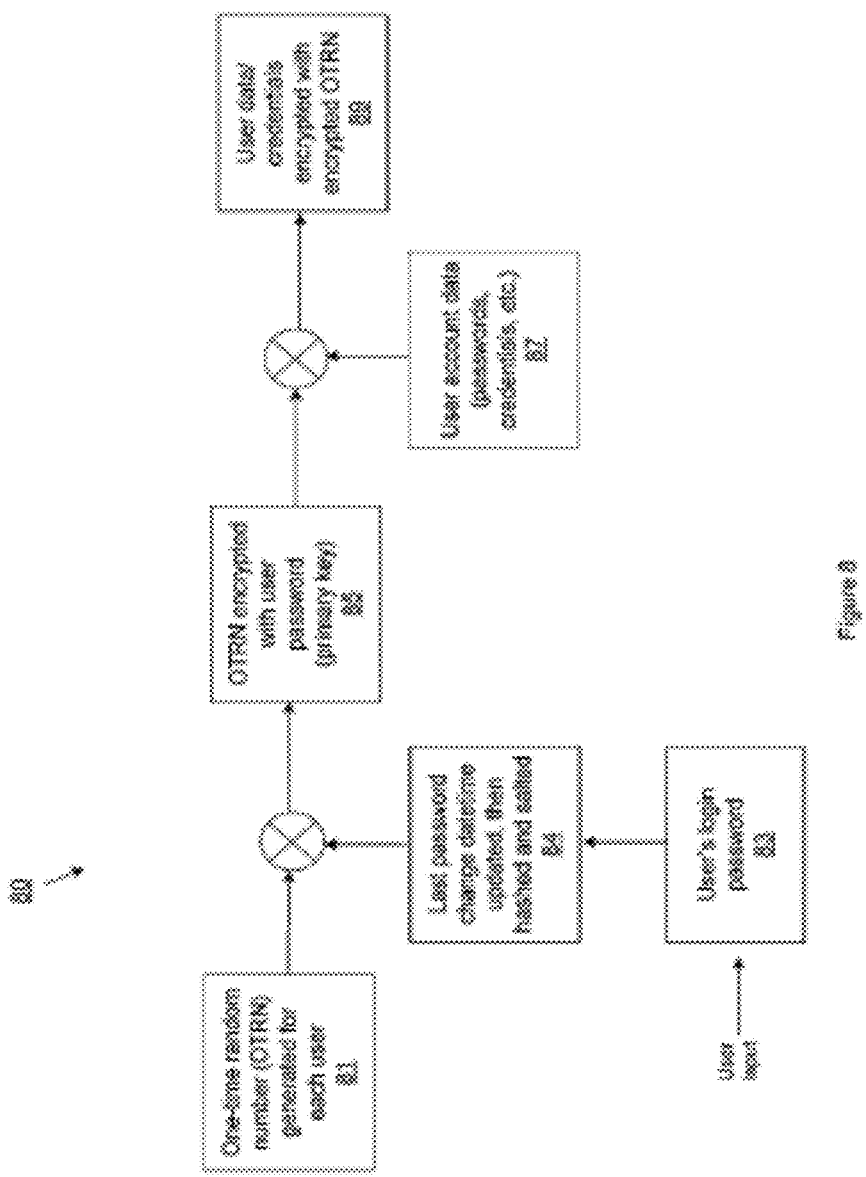
FIG. 8 illustrates an exemplary encryption algorithm according to the present disclosure.

In further embodiments, the encryption/decryption module 23 includes instructions for performing algorithm steps as shown in FIG. 8. Preferably, the encryption module 23 uses encryption standards as set forth in FIPS 140-2, 180-1, 180-2, and FIPS 197. In embodiments, the encryption/decryption module 23 is used to digitally sign received images/indicia/videos for Photo-login and Video-login. User data acquisition module 24 obtains input from the user through I/O device(s) as well as stored URI information, user data, credentials, etc. Optional storage module(s) 25 include any removable or non-removable storage media associated with the user computer 20. Communication module 26 performs communication with other computer devices over one or more networks, such as the Internet.

It is appreciated that the disclosed modules may take the form of computer executable instructions, such as program modules, executed by one or more computer or other devices. Program modules may include programs, routines, objects, data structures, etc. for performing particular tasks. Functionality of the modules may be combined or distributed as desired in various embodiments.

FIG. 8 illustrates an exemplary encryption algorithm according to the present disclosure (generally depicted by element 60). As shown in step 61, a one-time random number is generated for each user. Preferably the one-time random number is generated using a FIPS 140-2-approved random number generator. The one-time random number is then locally encrypted with the user's password 63 (entered into the browser and known only to the user). See step 65. In embodiments, the user's password is hashed and salted before being sent to the login server 40. However, it is appreciated that other one-way functions for encrypting the password are possible as long as data integrity is ensured. In step 67, other user data including documents, URIs and associated passwords/credentials, etc. are obtained by the browser and encrypted with the one-time random number (step 69). In other words, all user website details are further encrypted using the password-encrypted one-time random number.

In operation, a user enters his password on his browser, the browser hashes and salts the password before being sent to the login server 40. Server 40, in turn, generates a one-time random number and encrypts it with the hashed password/security question answer. During the browsing session, user device 20 browser obtains other user data/credentials and encrypts this information with the password-encrypted one-time random number. The resulting encrypted information is sent to the login server 40 for storage. When a user wants to login at a later time, he enters his password into the browser which is used to recover the one-time random number. The browser then uses the random number to decrypt the user's credentials and other data. In the event that the user happens to forget his password, the login server may present him with a pre-established question as a backup. If the user correctly answers the question, he is able to use this to decrypt the random number.

Figure 9:
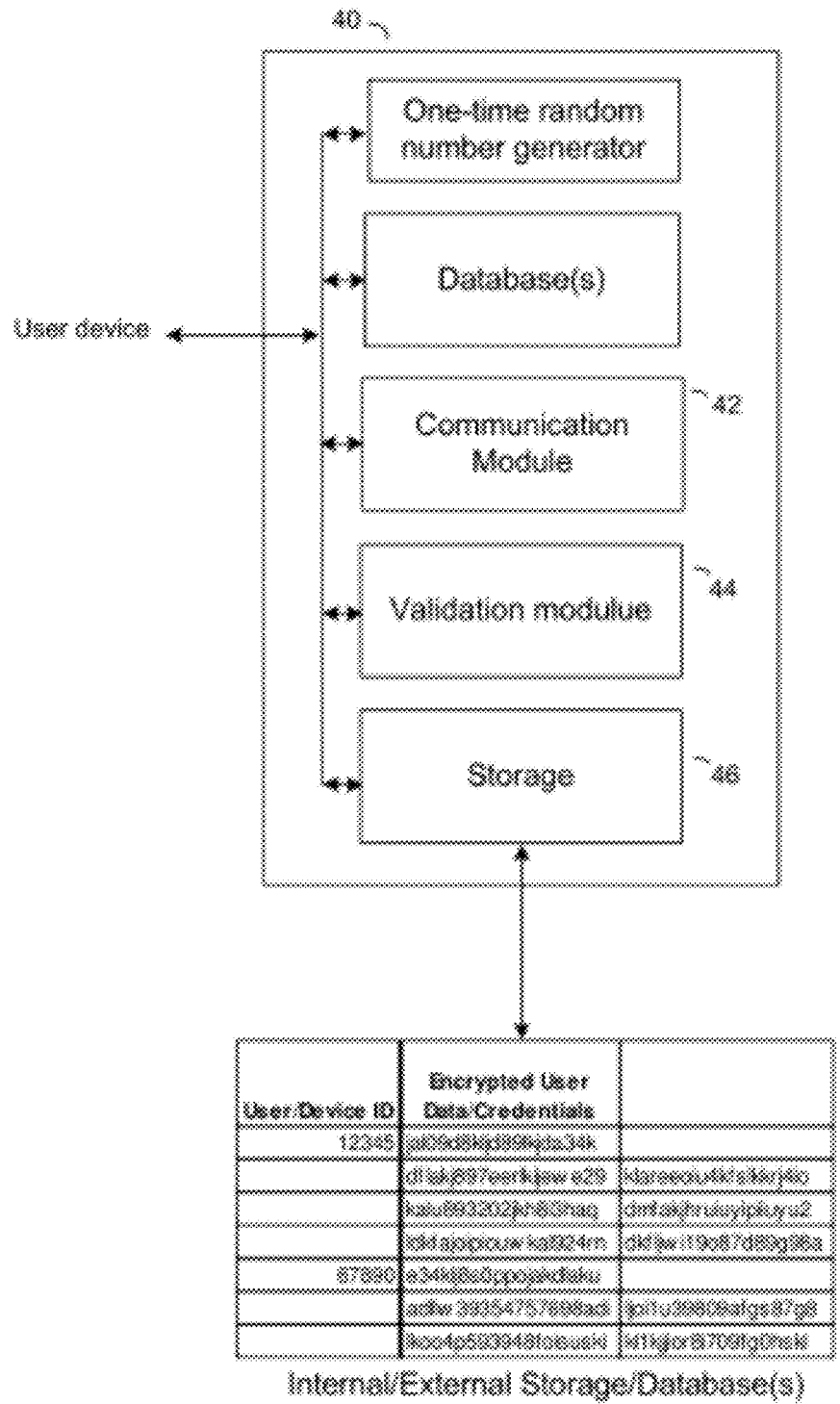
FIG. 9 illustrates an exemplary login server according to the present disclosure.

FIG. 9 illustrates an exemplary login server 40 according to the present disclosure. As shown in the figure, server 40, may comprise inter alia: a one-time random number generator 41, communication module 42, validation module 44, storage module(s) 46, and database(s) 47. Preferably, the one-time random number generator module 41 comprises one or more FIPS 140-2-approved random number generators. It is appreciated that communication module 42 performs communication with other devices over one or more networks, such as the Internet. Validation module 44 compares received encrypted user credentials with stored encrypted credentials and/or other user information in order to validate the user and may use a combination of standard/non-standard authentication protocols. Storage module 46 comprises internal and/or external storage and may include access to one or more distributed servers and/or databases. In embodiments, the login server 40 comprises one or more database(s) 47. Exemplary database fields may include username/email address and associated encrypted user data and/or credentials.

It is understood that the method steps and modules of the present disclosure may be performed using any combination of hardware and/or software as will be appreciated by those skilled in the art. Preferably, instructions residing on computer readable media configure the user computer and/or central computer to execute the method steps. Such instructions may be in the form of an API, plug-in, add-on, download, or the like and may also contain additional hardware and/or software instructions for performing the disclosed method steps and/or storing music/video content. Software instructions may further include custom macros, sub-routines, logic, or the like implemented using commercially available software such as MS SQL Server™, Visual Basic, C, C++, SMIL, XML, HTML, XHTML, Java, JavaScript, C#, APIs, etc.

According to a further embodiment, the software instructions for performing the disclosed method steps reside in whole, or in part, on a computer-readable medium. In embodiments, the computer readable medium corresponds to portions of storage media on user computer 20. Examples of computer readable media include, but are not limited to: hard drives, memory chips (e.g., RAM/ROM), memory sticks (e.g., USB), memory cards (e.g., SD, SIM, etc.), CDs, DVDs, tapes, or the like. In addition, the computer readable media may be integral with, or removable from, user computer 20.

Password Dashboard

To facilitate management of a user's account, the login server may provide a user-friendly graphical user interface (GUI), or dashboard. The dashboard may display icons of websites for which URI information and associated user credentials are stored for the user. In this way, the user can quickly and easily scroll through multiple icons of websites they have registered for. By simply clicking on an icon (selecting a URI), the user is automatically granted access to the website.

Administrative features of the dashboard include profiles, charts, and logs for the user. For example, the log view may allow the user to easily find a website he viewed two days ago, etc. The dashboard may provide other useful features such as groups, calendar, "remember-me", "logon-all", "logoff all" and more. Here, the user may also designate beneficiaries, or grant others access, to selected portions of his account. In a business setting, an Administrator may designate what websites/accounts a user is authorized to access, monitor charts, logs, etc.

Figure 10:
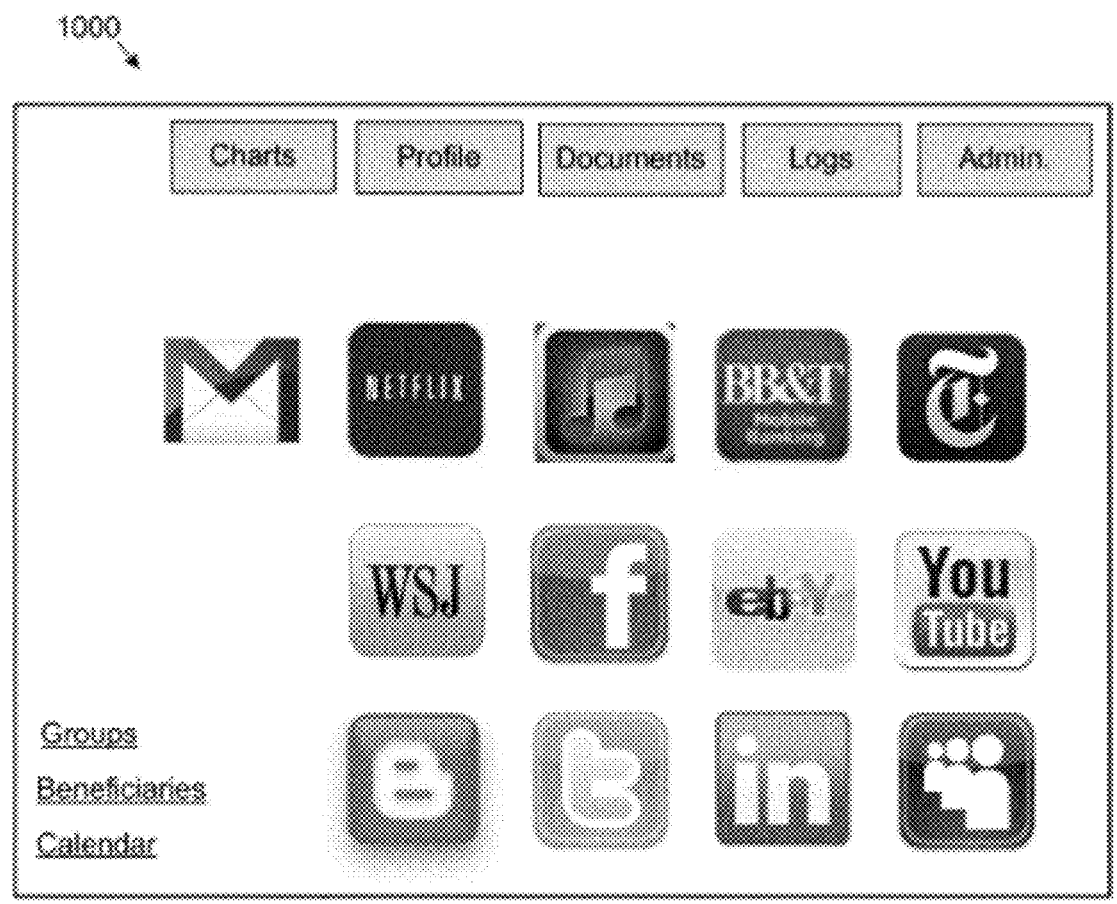
FIG. 10 illustrates an exemplary browser display according to principles of the present disclosure.

FIG. 10 shows an exemplary browser display 1000 for a user account according to the present disclosure. Once a user logs into their account via the login server 40, they may be provided with a dashboard for managing their credentials, data, etc. Advantageously, the user need only log in once to their account to have automatic access to other websites. For example, once the user logs in via the login server, he may automatically access his other financial, social networking, and entertainment accounts. As further shown in the figure, the dashboard may also include several value-added features such as user profile, documents, logs, administrative controls, and charts. Other useful features include groups, beneficiaries, calendar, and more.

As set forth above, the present disclosure avoids several pitfalls associated with centralized password/credential management. Decentralized credential management is enabled by a multi-layered security approach that employs best practices used by large organizations and end-to-end security. It is further appreciated that once the user enters his single password and is validated/logged in, the processes disclosed herein appear "seamless" to the user and only take a number of seconds. By providing decentralized credential management as disclosed, users are provided with more control and flexibility over their personal information in a highly secure manner. The user now has the ability to manage their own credentials and data and to control who may access specified portion(s). In addition, problems associated with centralized password storage, hacking, and phishing are avoided.

The foregoing discussion of the preferred embodiments has been presented for purposes of illustration and description. It is not intended to be exhaustive or to limit the disclosure to the above examples. Many variations and modifications of the embodiments described herein will be apparent to one of ordinary skill in the art in light of the present disclosure. For example, instead of the user creating their own password, a user may receive a randomly generated password, one-time password (OTP), etc. Accordingly, the scope of the disclosure is to be defined only by the claims appended hereto, and by their equivalents.

The invention claimed is:

1. A method for enabling an authorized user to perform optical login to one or more restricted websites or resources via a trusted user computer device in communication with a login server device comprising the steps of:
  If the optical login corresponds to quick response (QR) computer-readable login, the user computer device performing the following steps:
    obtaining information regarding a restricted website or resource the user desires to access over a computer network, wherein the information regarding the restricted website or resource is extracted from a displayed optical code and encrypted;
    submitting the encrypted information regarding the restricted website or resource extracted from the displayed optical code to a login server device for validation;
    upon validation of the encrypted information regarding the restricted web site or resource, receiving login credential(s) for the indicated website or resource from the login server in encrypted form; and
    locally decrypting the login credential(s) with a password-encrypted one-time random number via the user computer device browser and causing the user to be automatically logged in to the restricted website or resource;

wherein the one-time random number is generated by the login server device for each authorized user having an account with the login server;

wherein the one-time random number is provided by the login server to the user computer device during registration with the login server; and wherein the encrypted login credential information ensures that the authorized user's login credential information remains unknown to the login server; and If the optical login corresponds to photo login, the user computer device performing the following steps:

receiving a time-sensitive image from the login server device that only the authorized user would recognize;

displaying the time-sensitive image to the authorized user;

upon recognition of the time-sensitive image as valid, the authorized user sending an encrypted authentication-approval signal to the login server device, the authorized user thereby authenticating themselves;

upon receipt and validation of the encrypted authentication-approval signal by the login server device, the user computer device receiving encrypted login credential(s) for the restricted website or resource from the login server; and locally decrypting the login credential(s) for the restricted website or resource with a password-encrypted one-time random number via the user computer browser causing the authorized user to be automatically logged in to the restricted website or resource;

wherein the one-time random number is generated by the login server device for each authorized user having an account with the login server; and wherein the encrypted login credential information ensures that the user's credential information remains unknown to the login server.

2. The method of claim 1, wherein the time-sensitive image is pushed to the user computer device where it is displayed to the authorized user for a small time limit and then closed up.

3. The method of claim 1, further including obtaining encrypted user-created documents for the authorized user from the login server and locally decrypting the encrypted personal documents with the password-encrypted one-time random number via the user computer browser.

4. The method of claim 1, wherein the one-time random number is provided by the login server to the user computer device during registration with the login server and is stored on the user computer device.

5. The method of claim 4, wherein the one-time random number received from the login server is embedded in an optical code.

6. A computerized method for enabling an authorized user to perform optical login to one or more restricted websites or resources via a trusted user computer device in communication with a login server device over one or more computer networks, comprising the steps of:

obtaining information regarding a restricted website or resource the authorized user desires to access over a computer network, wherein the information is extracted from a displayed optical code and encrypted;

submitting the encrypted information regarding a restricted website or resource to a login server device for validation;

upon validation of the encrypted information regarding a restricted website or resource, receiving login credential(s) for the restricted website or resource from the login server device in encrypted form; and locally decrypting the login credential(s) with a password-encrypted one-time random number via the user computer browser and causing the authorized user to be automatically logged in to the restricted website or resource;

wherein the one-time random number is generated by the login server device for each authorized user having an account with the login server; and wherein the encrypted login credential information ensures that the user's credential information remains unknown to the login server device.

7. The method of claim 6, wherein the optical code corresponds to a quick response (QR) code.

8. The method of claim 6, wherein the optical code corresponds to a picture.

9. The method of claim 8, wherein the picture corresponds to a video time-sensitive image.

10. The method of claim 6, further including obtaining encrypted user-created documents for the authorized user from the login server and locally decrypting the encrypted personal documents with the password-encrypted one-time random number via the user computer browser.

11. The method of claim 6, wherein the one-time random number is provided by the login server to the user computer device during registration with the login server and is stored on the user computer device.

12. The method of claim 11, wherein the one-time random number received from the login server is embedded in an optical code.

13. A computerized method for enabling an authorized user to perform optical login to one or more restricted websites or resources via a trusted user computer device in communication with a login server device over one or more computer networks, comprising the steps of:

receiving a time-sensitive image from the login server device that only the authorized user would recognize;

displaying the time-sensitive image to the authorized user;

upon recognition of the time-sensitive image as valid, the authorized user sending an encrypted authentication-approval signal to the login server device, the authorized user thereby authenticating themselves;

upon receipt and validation of the encrypted authentication-approval signal by the login server device, the user computer device receiving encrypted login credential(s) for the restricted website or resource from the login server; and locally decrypting the login credential(s) with a password-encrypted one-time random number via the user computer device browser causing the authorized user to be automatically logged in to the restricted website or resource;

wherein the one-time random number is generated by the login server device for each authorized user having an account with the login server; and wherein the encrypted login credential information ensures that the user's login credential information remains unknown to the login server.

14. The method of claim 13, wherein the time-sensitive image corresponds to a video.

15. The method of claim 13, wherein the time-sensitive image is pushed to the user computer device where it is displayed to the authorized user for a small time limit and then closed up.

16. The method of claim 13, further including obtaining encrypted user-created documents for the authorized user from the login server and locally decrypting the encrypted personal documents with the password-encrypted one-time random number via the user computer browser.

17. The method of claim 13, wherein the one-time random number is provided by the login server to the user computer device during registration with the login server and is stored on the user computer device.

18. The method of claim 17, wherein the one-time random number received from the login server is embedded in an optical code.

19. The method of claim 13, wherein the time-sensitive image corresponds to an optical code.

20. The method of claim 19, wherein the optical code corresponds to a quick response (QR) code.

* * * * *